US012272933B2

(12) United States Patent
Lindquist et al.

(10) Patent No.: US 12,272,933 B2
(45) Date of Patent: Apr. 8, 2025

(54) CROSS-ARM PHASE-LIFTER

(71) Applicant: Altec Industries, Inc., Birmingham, AL (US)

(72) Inventors: David Lindquist, Cameron, MO (US); Timothy J. Mourlam, Shawnee, KS (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/224,278

(22) Filed: Jul. 20, 2023

(65) Prior Publication Data
US 2024/0039254 A1 Feb. 1, 2024

Related U.S. Application Data

(63) Continuation of application No. 17/875,990, filed on Jul. 28, 2022, now Pat. No. 11,749,978.

(51) Int. Cl.
*H02G 1/04* (2006.01)
(52) U.S. Cl.
CPC ..................... *H02G 1/04* (2013.01)
(58) Field of Classification Search
CPC .. H02G 1/02; H02G 1/04; H02G 7/00; H02G 7/20
See application file for complete search history.

(56) References Cited

U.S. PATENT DOCUMENTS

| | | | |
|---|---|---|---|
| 1,050,004 A | 1/1913 | Jeremiah | |
| 1,676,584 A | 7/1928 | Tideman | |
| 1,966,989 A | 7/1934 | Bernard | |
| 2,662,730 A | 12/1953 | Crawford | |
| 2,786,092 A | 3/1957 | Gage | |
| 3,139,948 A | 7/1964 | Rorden | |
| 4,831,662 A | 5/1989 | Kuhn | |
| 4,937,759 A | 6/1990 | Vold | |

(Continued)

FOREIGN PATENT DOCUMENTS

| CN | 108789416 A | 11/2018 |
|---|---|---|
| CN | 113902990 A | 1/2022 |

(Continued)

OTHER PUBLICATIONS

Aracil et al. "Advanced Teleoperated System for Live Power Line Maintenance" (Year: 2001).

(Continued)

*Primary Examiner* — Dean J Kramer
(74) *Attorney, Agent, or Firm* — Erise IP, P.A.

(57) ABSTRACT

Disclosed embodiments provide a cross-arm phase-lifter for lifting and maneuvering a utility pole cross-arm without the need to remove the energized power lines from the cross-arm. A first embodiment of the cross-arm phase-lifter may comprise a set of clamps, clamping members, and actuators. When the actuators are driven, the clamping members may secure the clamps onto the cross-arm. Once the clamps are secured, the cross-arm may be lifted and suspended in air. A second embodiment may comprise a lifting plate comprising a plurality of pegs configured to interface with brackets on the cross-arm. When the pegs are engaged with the brackets, the cross-arm may be lifted and suspended in air.

20 Claims, 10 Drawing Sheets

(56) References Cited

U.S. PATENT DOCUMENTS

| | | | |
|---|---|---|---|
| 5,076,449 | A | 12/1991 | Clutter |
| 5,105,367 | A | 4/1992 | Tsuchihashi et al. |
| 5,196,998 | A | 3/1993 | Fulton |
| 5,215,202 | A | 6/1993 | Fujimoto |
| 5,286,159 | A | 2/1994 | Honma |
| 5,640,876 | A | 6/1997 | Erwin |
| 5,782,440 | A | 7/1998 | Ozga et al. |
| 6,250,588 | B1 | 6/2001 | Numbers et al. |
| 6,325,749 | B1 | 12/2001 | Inokuchi et al. |
| 6,507,163 | B1 | 1/2003 | Allen |
| 6,527,405 | B2 | 3/2003 | Hsieh |
| 7,224,382 | B2 | 5/2007 | Baker |
| 9,203,219 | B2 | 12/2015 | Devine et al. |
| 9,707,680 | B1 | 7/2017 | Jules et al. |
| 9,727,053 | B2 | 8/2017 | Ito |
| 10,105,853 | B1 | 10/2018 | Hwang et al. |
| 10,589,433 | B2 | 3/2020 | Nahwi et al. |
| 10,626,632 | B2* | 4/2020 | Sauber ................ E04H 12/345 |
| 11,660,750 | B1* | 5/2023 | Sykes ..................... B25J 9/163 700/245 |
| 11,717,969 | B1* | 8/2023 | Mourlam ............. B25J 19/023 700/247 |
| 11,742,108 | B1* | 8/2023 | Naber ..................... H01B 7/02 174/110 R |
| 11,749,978 | B1* | 9/2023 | Lindquist ................ H02G 1/02 294/174 |
| 11,794,359 | B1* | 10/2023 | Sykes ..................... B25J 9/162 |
| 2001/0055525 | A1 | 12/2001 | Inokuchi et al. |
| 2002/0179559 | A1 | 12/2002 | Hashiguchi et al. |
| 2003/0029215 | A1 | 2/2003 | Latour |
| 2003/0174286 | A1 | 9/2003 | Trumbull |
| 2004/0112207 | A1 | 6/2004 | Price |
| 2004/0182235 | A1 | 9/2004 | Hart |
| 2006/0045294 | A1 | 3/2006 | Smyth |
| 2007/0124024 | A1 | 5/2007 | Okamoto et al. |
| 2007/0192910 | A1 | 8/2007 | Vu et al. |
| 2007/0291128 | A1 | 12/2007 | Wang et al. |
| 2008/0188986 | A1 | 8/2008 | Hoppe |
| 2009/0088773 | A1 | 4/2009 | Zhao et al. |
| 2009/0088897 | A1 | 4/2009 | Zhao et al. |
| 2011/0036605 | A1 | 2/2011 | Leong et al. |
| 2011/0245844 | A1 | 10/2011 | Jinno |
| 2011/0256995 | A1 | 10/2011 | Takazakura et al. |
| 2013/0011220 | A1 | 1/2013 | Jacobsen et al. |
| 2013/0014852 | A1 | 1/2013 | Hayden et al. |
| 2013/0313042 | A1 | 11/2013 | Freeman et al. |
| 2014/0014637 | A1 | 1/2014 | Hunt |
| 2014/0094968 | A1 | 4/2014 | Taylor et al. |
| 2015/0015708 | A1 | 1/2015 | Collett et al. |
| 2015/0044009 | A1 | 2/2015 | Yang et al. |
| 2015/0312468 | A1 | 10/2015 | Taylor et al. |
| 2016/0239080 | A1 | 8/2016 | Marcolina et al. |
| 2017/0289445 | A1 | 10/2017 | Kumar et al. |
| 2017/0340969 | A1 | 11/2017 | Lim et al. |
| 2018/0011681 | A1 | 1/2018 | Kada |
| 2018/0032130 | A1 | 2/2018 | Meglan |
| 2018/0037172 | A1 | 2/2018 | Nelson et al. |
| 2018/0057322 | A1 | 3/2018 | Schiller et al. |
| 2018/0243921 | A1 | 8/2018 | Hashimoto et al. |
| 2018/0313885 | A1 | 11/2018 | Bilic et al. |
| 2019/0125462 | A1 | 5/2019 | Peine et al. |
| 2019/0176334 | A1 | 6/2019 | Zhou et al. |
| 2019/0201136 | A1 | 7/2019 | Shelton, IV et al. |
| 2019/0222004 | A1 | 7/2019 | Turnbull |
| 2019/0256335 | A1 | 8/2019 | Araki |
| 2019/0257097 | A1 | 8/2019 | Kawai et al. |
| 2020/0122321 | A1 | 4/2020 | Khansari Zadeh et al. |
| 2020/0139227 | A1 | 5/2020 | Mikhailov et al. |
| 2020/0302207 | A1 | 9/2020 | Perkins et al. |
| 2021/0001483 | A1 | 1/2021 | Milenkovic |
| 2021/0020337 | A1 | 1/2021 | Ciapala et al. |
| 2021/0106342 | A1 | 4/2021 | Blackwell |
| 2021/0252714 | A1 | 8/2021 | Tsutsui et al. |
| 2021/0269291 | A1 | 9/2021 | Callaghan et al. |
| 2021/0273424 | A1* | 9/2021 | Harvey ................ B66C 23/702 |
| 2021/0282871 | A1 | 9/2021 | Prior et al. |
| 2021/0305790 | A1 | 9/2021 | O'Connell et al. |
| 2021/0315590 | A1 | 10/2021 | Chappuis et al. |
| 2021/0370509 | A1 | 12/2021 | Pivac |
| 2022/0032476 | A1 | 2/2022 | Robertson |
| 2022/0138612 | A1 | 5/2022 | Vengertsev et al. |
| 2022/0203562 | A1 | 6/2022 | Brown et al. |
| 2022/0212340 | A1 | 7/2022 | Hasegawa et al. |
| 2022/0212345 | A1 | 7/2022 | Smith et al. |
| 2022/0241975 | A1 | 8/2022 | Tan et al. |
| 2022/0266449 | A1 | 8/2022 | Hasegawa et al. |
| 2022/0287676 | A1 | 9/2022 | Steines et al. |
| 2022/0288669 | A1 | 9/2022 | Goodall et al. |
| 2022/0383531 | A1 | 12/2022 | Santini et al. |
| 2023/0046644 | A1 | 2/2023 | Themelis |
| 2023/0157525 | A1 | 5/2023 | Hunter et al. |
| 2023/0200920 | A1 | 6/2023 | Mittman |
| 2023/0270321 | A1 | 8/2023 | Breton et al. |

FOREIGN PATENT DOCUMENTS

| | | |
|---|---|---|
| JP | 5285880 B2 | 9/2013 |
| JP | 6840052 | 3/2021 |
| KR | 102207182 B1 | 1/2021 |
| WO | 9532078 A1 | 11/1995 |
| WO | 2017220822 A1 | 12/2017 |
| WO | 2020203793 A1 | 10/2020 |

OTHER PUBLICATIONS

Aracil et al. "ROBTET a new teleoperated system for live-line maintenance" (Year: 1995).

Aracil et al. "Teleoperated system for live power lines maintenance" Div. Ingenieria de Sistemas y Automatica (DISAM), Polytechnic University of Madrid, Spain.

Du et al. "A teleoperated robotic hot stick platform for the overhead live powerline maintenance tasks" (Year: 2019).

Faucher et al. "Ground operated teleoperation system for live powerline maintenance" (Year: 1996).

iStock, "Lineman hanging new "pot" aka transformer on telephone pole stock photo", Apr. 22, 2016, https://www.istockphoto.com/photo/lineman-hanging-new-pot-aka-transformer-on-telephone-pole-gm951987990-259883755 (Year: 2016).

Owen-Hill, "3 types of robot singularities and how to avoid them," Mar. 2, 2016, Robohub.org, https://robohub.org/3-types-of-robot-singularities-and-how-to-avoid-them/ (Year: 2016).

PCT Patent Application PCT/US2023/028564 International Search Report and Written Opinion of the International Searching Authority, issued Nov. 22, 2023.

U.S. Appl. No. 18/368,155 Non-Final Office Action issued Jun. 21, 2024.

U.S. Appl. No. 17/875,674, Final Office Action dated Feb. 15, 2023.

U.S. Appl. No. 17/875,674, Non-Final Office Action dated Oct. 13, 2022.

U.S. Appl. No. 17/875,674, Notice of Allowance and Interview Summary dated Jun. 16, 2023.

U.S. Appl. No. 17/875,743, Final Office Action dated Jan. 10, 2023.

U.S. Appl. No. 17/875,743, Non-Final Office Action dated Sep. 22, 2022.

U.S. Appl. No. 17/875,743, Notice of Allowance and Interview Summary dated Mar. 27, 2023.

U.S. Appl. No. 17/875,796, Non-Final Office Action dated Apr. 5, 2023.

U.S. Appl. No. 17/875,796, Notice of Allowance dated Aug. 2, 2023.

U.S. Appl. No. 18/135,941 Non-Final Office Action issued Aug. 16, 2024.

U.S. Appl. No. 18/197,438 Notice of Allowance issued Aug. 5, 2024.

U.S. Appl. No. 18/385,545 Notice of Allowance issued Jul. 15, 2024.

* cited by examiner

CROSS-ARM PHASE-LIFTER

RELATED APPLICATIONS

This patent application is a continuation application claiming priority benefit, with regard to all common subject matter, of U.S. patent application Ser. No. 17/875,990, filed Jul. 28, 2022, and entitled "CROSS-ARM PHASE-LIFTER." The above referenced patent application is hereby incorporated by reference in its entirety into the present application.

BACKGROUND

1. Field

Embodiments of the present teachings relate to operating on energized power lines. More specifically, embodiments of the present teachings relate to a phase-lifter for manipulating cross-arms on utility poles.

2. Related Art

Utility workers commonly utilize an aerial device to reach remote locations, such as overhead power lines, for installation, repair, and/or maintenance of electric power components. Due to the inherent dangers with operating on live power lines and at high heights, it is desired to perform power line maintenance in a safer manner by removing the lineman from near the power line to a safe location away from the power line. For example, robotics may be used to operate on live lines. The robotics may be controlled remotely by the operator, such as from within a utility truck cabin, thereby eliminating fall and electrocution danger for the operator.

Typically, when a utility pole needs maintenance, such as the replacement of a cross-arm, energized power lines thereon (often referred to as phases) must be carefully and individually removed and placed onto a temporary phase-holder to avoid interfering with the maintenance process. The temporary phase-holder is housed on a machine (e.g., aerial device or derrick) that is oftentimes separate from the vehicle that supports the boom and utility bucket from which the lineman works. In other cases, the temporary phase holding is performed from the aerial device from which the lineman is working. After maintenance has been completed, the phases must be placed back onto the cross-arm. Because energized power lines are dangerous to work with due to high voltages, decreasing the number of interactions with energized power lines can increase the safety for lineman.

What is needed is a cross-arm phase-lifter for manipulating cross-arms. Further, what is needed is a cross-arm phase-lifter for lifting cross-arms without needing to remove power lines off insulators atop the cross-arms. Further still, what is needed are systems and methods for working on energized power lines that can be performed with less equipment than existing systems.

SUMMARY

Embodiments of the present teachings solve the above-mentioned problems by providing cross-arm phase-lifters for manipulating utility pole cross-arms. The cross-arm phase lifter may manipulate cross-arms without the need to remove the energized power lines therefrom. In some embodiments, insulators that do not require wire ties to couple the conductor line thereto are used to facilitate the movement of the cross-arm along the conductors. For example, clamp-style insulators may be used. The cross-arm phase-lifter may be operated by a lineman or a remotely-operated robot unit. In some embodiments, the cross-arm phase-lifter comprises a plurality of clamping members for clamping onto the cross-arm. In some embodiments, the cross-arm phase-lifter comprises a lifting plate comprising a plurality of pegs that engage with a respective plurality of brackets that are mounted onto the cross-arm. Once coupled to the cross-arm, the cross-arm phase-lifter may be driven to raise the cross-arm off the pole and hold the cross-arm in suspension to allow for maintenance to be performed on the utility pole.

The cross-arm phase-lifter may be used when replacing an existing cross-arm with a new cross-arm. Because the cross-arm phase-lifter may suspend a cross-arm in air, the energized power lines may be transferred directly onto the suspended, new cross-arm without the need of a temporary phase-holder and the extra equipment associated therewith. The new cross-arm may then be installed directly onto the utility pole, without the lineman or robot unit having to transfer the energized power lines to and from a temporary phase holder.

In a first embodiment, the techniques described herein relate to a phase-lifter for manipulating utility pole cross-arms coupled to energized power lines, including: a structural member including a first end and a second end; a first clamping member including a first clamp; a second clamping member including a second clamp, wherein the first clamping member and the second clamping member are coupled to the first end of the structural member; a third clamping member including a third clamp; and a fourth clamping member including a fourth clamp, wherein the third clamping member and the fourth clamping member are coupled to the second end of the structural member; a first actuator for actuating the first clamp and the second clamp to couple the first clamp and the second clamp to the cross-arm; and a second actuator for actuating the third clamp and the fourth clamp to couple the third clamp and the fourth clamp to the cross-arm.

In a second embodiment, the techniques described herein relate to the phase-lifter of embodiment one, wherein the first actuator includes: a threaded stud received within a first actuator block and a second actuator block, wherein the first actuator block is coupled to the first clamping member and the second actuator block is coupled to the second clamping member, and wherein rotation of the threaded stud causes the first actuator block to move towards the second actuator block, thereby moving the second clamp towards the first clamp.

In a third embodiment, the techniques described herein relate to the phase-lifter described in embodiments one and two, wherein the wherein at least one of first actuator or the second actuator comprises one of an electric actuator, a hydraulic actuator, or a pneumatic actuator, wherein the first actuator and the second actuator comprise one of a linear actuator or a rotary actuator.

In a fourth embodiment, the techniques described herein relate to the phase-lifter described in any of embodiments one through three, further including: a bracket protruding from the structural member, wherein the bracket is configured to connect the phase-lifter to a supporting structure, wherein the supporting structure is configured to move the phase-lifter to manipulate the cross-arm.

In a fifth embodiment, the techniques described herein relate to the phase-lifter described in any of embodiments one through four, wherein the supporting structure is a boom assembly.

In a sixth embodiment, the techniques described herein relate to the phase-lifter described in any of embodiments one through four, wherein the supporting structure is a pole clamp configured to couple to a utility pole.

In a seventh embodiment, the techniques described herein relate to the phase-lifter described in any of embodiments one through six, wherein the first clamping member is pivotally coupled to the second clamping member, and wherein the third clamping member is pivotally coupled to the fourth clamping member.

In an eight embodiment, the techniques described herein relate to the phase-lifter described in any of embodiments one through seven, wherein at least one of the first clamp, the second clamp, the third clamp, or the fourth clamp is spring-loaded to align the clamps to the cross-arm.

In a ninth embodiment, the techniques described herein relate to a system for manipulating utility pole cross-arms coupled to energized power lines, including: an aerial device including a boom assembly; a robot unit at a distal end of the boom assembly; and the phase-lifter, including: at least one engaging member for coupling to the cross-arm; a structural member coupled to the at least one engaging member; and a connecting member configured to couple the phase-lifter to a supporting structure, wherein the phase-lifter is driven by the supporting structure to lift the cross-arm off a utility pole and holds the cross-arm in suspension to allow maintenance to be performed on the utility pole.

In a tenth embodiment, the techniques described herein relate to the system described in embodiment ten, wherein the phase-lifter holds the cross-arm without removing the energized power lines therefrom.

In an eleventh embodiment, the techniques described herein relate to the system described in embodiments nine and ten, wherein the supporting structure is supported by a high-capacity manipulator of a robot unit, the robot unit disposed on a distal end of a boom on an aerial device.

In an twelfth embodiment, the techniques described herein relate to the system described in any of embodiments nine through eleven, wherein the cross-arm is a new cross-arm, wherein at least one robotic arm of the robot unit is configured to transfer the energized power lines from an old cross-arm to the new cross-arm, and wherein the high-capacity manipulator lifts the phase-lifter to install the new cross-arm onto the utility pole.

In a thirteenth embodiment, the techniques described herein relate to the system described in any of embodiments nine through twelve, wherein the at least one engaging member includes a first clamping member pair and a second clamping member pair, and wherein a robotic arm of the robot unit actuates the first clamping member pair and the second clamping member pair to clamp the first clamping member pair and the second clamping member pair onto the cross-arm.

In a fourteenth embodiment, the techniques described herein relate to the system described in any of embodiments nine through thirteen, wherein the first clamping member pair and the second clamping member pair are actuated using an impact drill operated by the robotic arm.

In a fifteenth embodiment, the techniques described herein relate to the system described in any of embodiments nine through fourteen, wherein the at least one engaging member includes a lifting arm including a first peg and a second peg on a face of the structural member, and wherein the first peg engages with a first bracket on the cross-arm and the second peg engages with a second bracket on the cross-arm.

In a sixteenth embodiment, the techniques described herein relate to the system described in any of embodiments nine through fifteen, wherein the first bracket and the second bracket are attached by a robotic arm of the robot unit.

In a seventeenth embodiment, the techniques described herein relate to a system for manipulating utility pole cross-arms coupled to energized power lines, including: an aerial device including a boom; a robot unit disposed on a distal end of a boom, including: at least one robotic arm; and a high-capacity manipulator; and a phase-lifter coupled to the high-capacity manipulator, including: a first pair of clamping members and a second pair of clamping members for coupling to a cross arm; and at least one actuator for actuating the first pair of clamping members and the second pair of clamping members.

In an eighteenth embodiment, the techniques described herein relate to the system described in embodiment seventeen, wherein the high-capacity manipulator lifts the phase-lifter to remove the cross-arm from a utility pole.

In a nineteenth embodiment, the techniques described herein relate to the system described in embodiments seventeen and eighteen, wherein the at least one robotic arm is configured to detach the cross-arm from the phase-lifter.

In a twentieth embodiment, the techniques described herein relate to the system described in any of embodiments seventeen through nineteen, wherein the at least one actuator is a motor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments of the present teachings are described in detail below with reference to the attached drawing figures, wherein.

Figure 1:
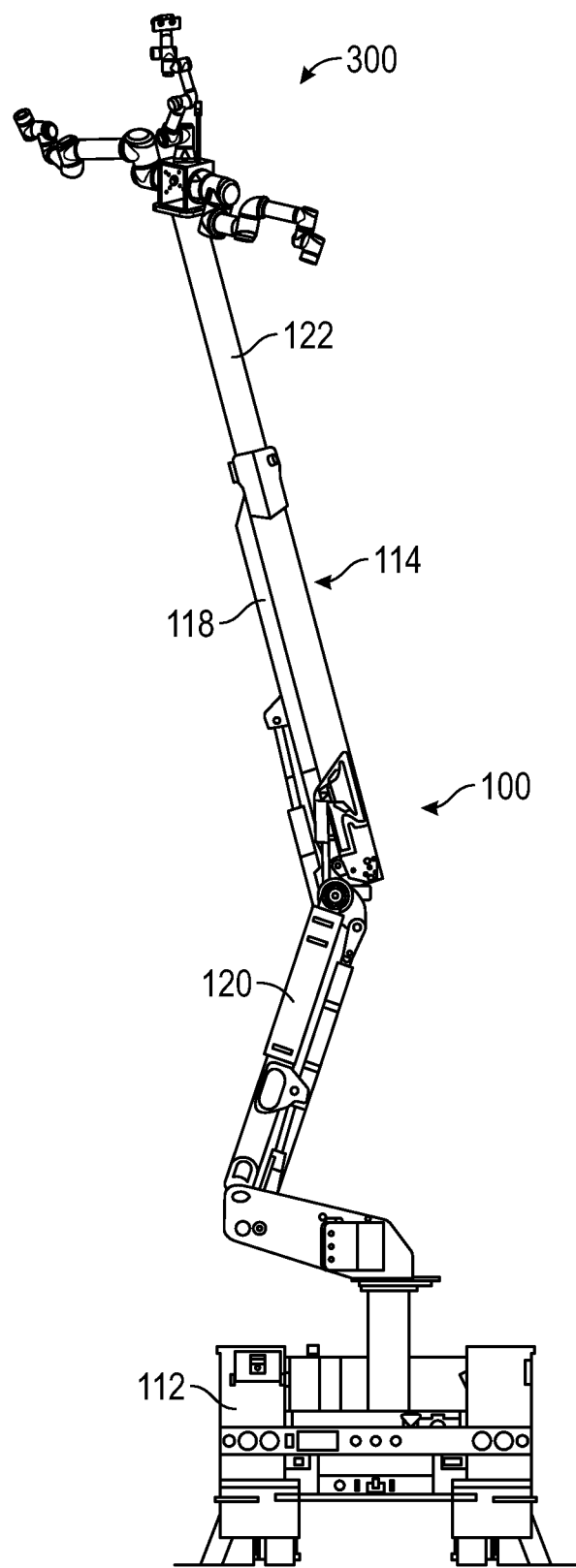
FIG. 1 is an aerial device for some embodiments.

The drawing figures do not limit the present teachings to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the present teachings. Other embodiments can be utilized, and changes can be made without departing from the scope of the present teachings. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure relate to a cross-arm phase-lifter for manipulating a cross-arm without needing to remove energized power lines therefrom. The phase-lifter may comprise a first pair and a second pair of clamping members disposed on a respective first end and second ends of a crossbar. Each clamping member may comprise a clamp for engaging with the cross-arm. The clamping members may be driven by an actuator to clamp onto the cross-arm. In some embodiments, the cross-arm phase-lifter comprises a lifting plate that comprises one or more pegs. The one or more pegs may engage with one or more brackets mounted onto the cross-arm to couple the phase-lifter thereto.

Once the phase-lifter is coupled to the cross-arm, the phase-lifter may be lifted to suspend the cross-arm, allowing for maintenance to be performed on the utility pole. Once the maintenance is complete, the phase-lifter may be lowered to place the cross-arm back on to the utility pole. In some embodiments, the cross-arm phase-lifter is coupled to a distal end of a boom assembly. To lift the cross-arm, the phase-lifter may couple to the cross-arm, and the boom assembly may be actuated to lift the phase-lifter and the cross-arm therewith. The cross-arm phase-lifter may be used to replace a cross-arm without having to transfer the energized power lines to and from a temporary phase-holder. Instead, the energized power lines may be transferred from an existing cross-arm and attached directly onto a new cross-arm held by the phase-lifter. The cross-arm phase-lifter may be coupled to and powered by a supporting structure, such as a robot unit, high capacity lifting-arm, or jib extension.

Exemplary Aerial Device

FIG. 1 depicts an aerial device 100 of some embodiments. The aerial device 100 comprises a utility vehicle 112, a boom assembly 114, and a remote assembly system 300. The boom assembly 114 comprises a boom 118 having a boom proximal end 120 and a boom distal end 122. In some embodiments, the boom 118 is one of a telescoping boom 118 or an articulating boom 118. The boom assembly 114 may be attached to the utility vehicle 112 at the boom proximal end 120. The remote assembly system 300 may be secured to the boom distal end 122, such that the remote assembly system 300 is supported by the boom assembly 114. In some embodiments, and as described in greater detail below, the remote assembly system 300 may comprise at least a robot unit adapted for performing telecommunications repair, power line repair, general repair work, or other actions that may be performed by a robot. The robot unit may comprise utility tools for sawing, cutting, screwing, wiring, or other actions associated with repair work. In some embodiments, the boom 118 is used to position the remote assembly system 300 in a remote location, such as, for example adjacent to an energized power line.

As described herein, the robot unit may be controlled remotely by an operator to perform actions, such as power line repair work. For example, the robot unit may control the phase-lifter described in embodiments herein. Through such remote control, the operator is removed from any potentially dangerous situations. To provide the operator with visual, sensory, and other information, the robot unit may further comprise a sensory capturing system comprising at least a camera and a three-dimensional depth camera. Video information may be provided to the operator through a virtual reality ("VR") headset and the operator may issue commands through joysticks or other controllers to instruct the robot unit to perform an action. To aid the operator and/or the robot unit in performing actions efficiently and correctly, three-dimensional depth information may be captured by the three-dimensional depth camera for generating a three-dimensional representation of the field of view at a computer. Accordingly, the computer can receive instructions, compare the instructions to the three-dimensional representation, and cause the robot unit to perform an action based on the instructions and the three-dimensional representation. To further aid in providing a realistic and immersive experience to the operator, the robot unit may comprise a six degree-of-freedom ("DOF") camera mount for mimicking or replicating the movement of the operator. Accordingly, in addition to movement in the x, y, and z planes, the robot unit can further control pitch, yaw, and roll of the camera mount. However, it will be appreciated that particular embodiments and applications of the present teachings may vary, including any of the examples provided herein. For example, the present teachings may be utilized in a variety of applications, including but not limited to military applications, construction applications, rescue applications, health and safety applications or other applications that robotics may be utilized. Accordingly, it will be appreciated that specific embodiments or details provided herein are intended to be illustrative, rather than limiting.

Exemplary System Architecture

Figure 2:
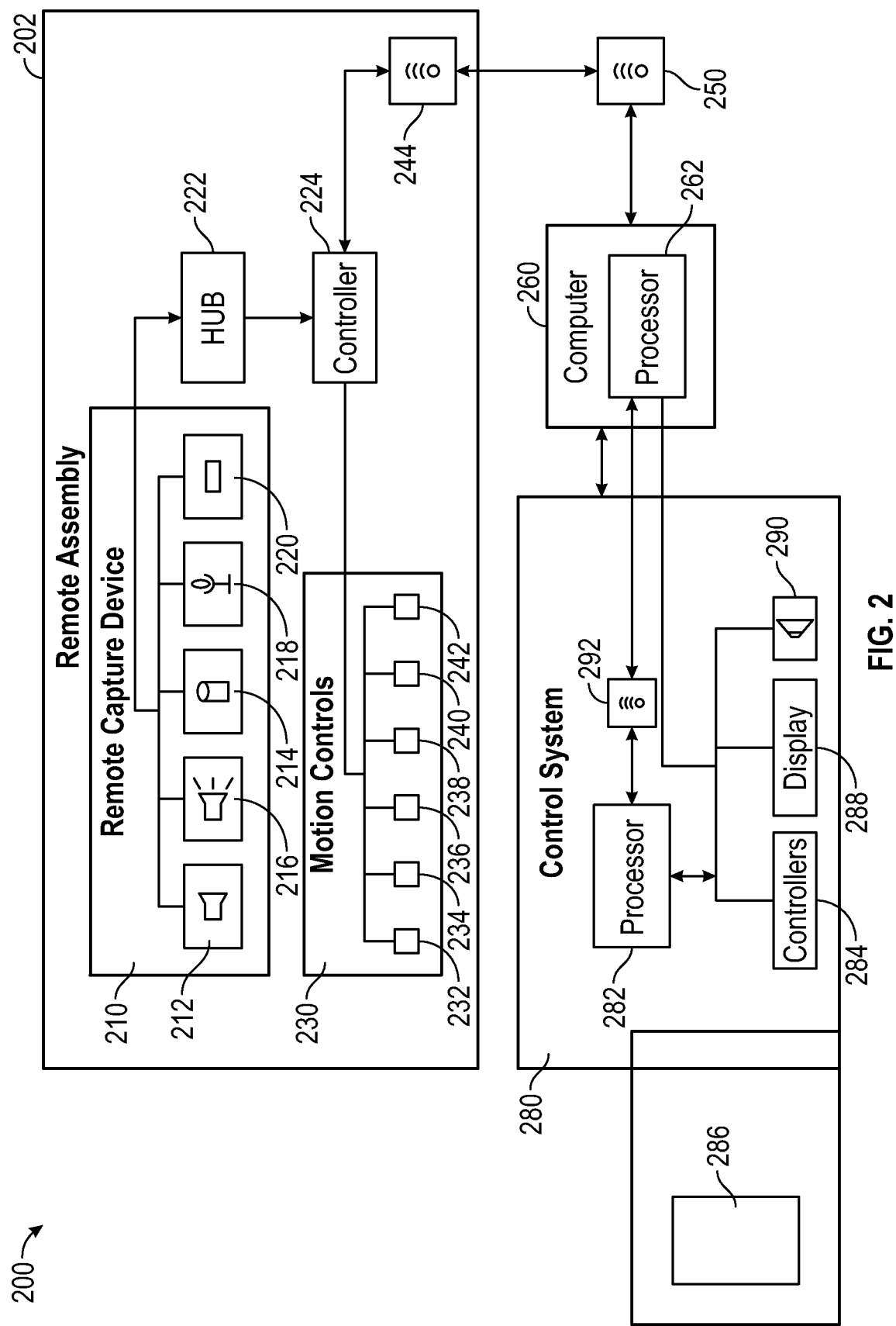
FIG. 2 is an exemplary system architecture of a robot unit and manual controls for some embodiments.

FIG. 2 depicts an exemplary block diagram 200 related to embodiments of the present teachings. In some embodiments, the remote assembly system 300 comprises various assemblies, sub-assemblies, parts, or components for capturing sensory information and/or for performing actions, such as repair work in a telecommunication setting. The remote assembly system 300 may comprise various circuitry, parts, or other components for capturing sensory information, including video, three-dimensional depth information, audio, and other sensory data. Further, the remote assembly system 300 may comprise a manually controlled or autonomous robot unit that may be positioned at the end of the boom assembly 114 for interacting with a work site to perform one or more tasks. For example, as described above, in many real-life scenarios, tasks to be performed may not be discovered until reaching the job site, and accordingly, the robot unit may comprise a variety of tools, features, or functions to respond to a variety of different tasks. Additionally, as described in greater detail below, the remote robot assembly may further comprise one or more parts, components, or features for providing an operator with sensory information, providing the operator with additional information about the job site to improve efficiency, efficacy, and/or safety of both the remote assembly system 300 and the operator.

As depicted in the block diagram 200, a remote assembly 202 comprises at least a remote capture device 210, a computer 260, and a control system 280. In some embodiments, and as described in greater detail herein, the remote capture device 210 may be a device configured and adapted for the capturing of sensory information and may be positioned on a robot unit for the capturing of sensory information that may be utilized by computer 260, to present information to an operator via control system 280, among other purposes. FIG. 2 depicts exemplary sensors, cameras, and other apparatuses that may be utilized by remote capture device 210 for the capturing of sensory information. As described in greater detail below, remote capture device 210 may be mounted or positioned on a selectively movable mount or portion of a robot unit. For example, the robot unit may be a robot unit positioned at the end of a boom assembly for aerial applications. However, remote capture device 210 may also be used with a robot unit that is not attached on a boom assembly, and for example, may be utilized with a robot unit for ground application or attached to a mechanical arm or an aerial drone. Accordingly, via the robot unit, sensory information may be captured by remote capture device 210.

Through selective inputs, including both manually inputted instructions and/or automated instructions, remote capture device 210 may capture video, still images, three-dimensional depth information, audio, electrical conductivity, voltage, among other information that may be captured by a sensor or recording device. For example, remote capture device 210 may comprise at least one camera 212 for the capturing of video or still images (collectively, "video"). The at least one camera 212 may be a camera positioned on remote capture device 210 for the capturing of video within a selected field of view. The resolution of the video captured by camera 212 may vary, but in some embodiments, camera 212 may be a camera configured for capturing in at least 720p resolution but may capture in higher resolution including but not limited to 1080p, 2K, 3K, 4K, or 8K resolution. However, it will be appreciated that the camera 212 may be any currently known or yet to be discovered camera for capturing video. Video captured from camera 212 may be stored locally at remote capture device 210 at a local memory 214. The storing of video at local memory 214 may aid in providing a failsafe or backup storage of captured video in the event of a transmission or upload failure. Further, the storing of video at local memory 214 may aid in situations of poor wireless connection or if a direct line becomes loose or interrupted, preventing the immediate transmission of captured video. Optionally or additionally, video captured from camera 212 may be transmitted to computer 260 for processing, analyzing, storage, and/or for later transmitting to control system 280. In further embodiments, video captured from camera 212 may be directly transmitted to control system 280 for processing.

In some embodiments, remote capture device 210 may further comprise at least one three-dimensional camera 216 or other device configured for capturing three-dimensional depth information. As described in greater detail below, the three-dimensional depth camera 216 may be utilized for capturing three-dimensional depth information within a field of view for creating a point cloud, 3-D model, or other digital representation of an object or area scanned or viewed by the three-dimensional camera 216. Three-dimensional camera 216 may be operated in conjunction with, or independent from camera 212 or other components or parts of remote assembly 202 and/or remote capture device 210. As described in greater detail below, in response to instructions or an input, three-dimensional camera 216 may begin capturing three-dimensional depth information about an object or area within a field of view. Like the captured video with respect to camera 212, the three-dimensional depth information captured by three-dimensional camera 216 may be saved locally at memory 214. In some embodiments, remote capture device 210 may comprise a separate memory 214 for video captured by camera 212 and a separate memory 214 for three-dimensional information captured by three-dimensional camera 216. As described in greater detail below, remote capture device 210 may comprise a microphone 218 and/or at least one sensor 220 for capturing additional sensory information. Accordingly, in some embodiments, a separate and distinct memory 214 may be used for each sensory capture device (i.e., camera 212, three-dimensional camera 216, microphone 218, and/or sensor 220). In further embodiments, remote capture device 210 may comprise a single memory 214 for the storing of all captured sensory information. As described above and in further embodiments, three-dimensional information may be directly sent to computer 260 in addition to or instead of storing locally at memory 214.

In addition to capturing video and/or three-dimensional information, it may also be advantageous for remote capture device 210 to capture additional sensory information that may be presented to an operator or processed by computer 260. For example, in certain scenarios it may be advantageous for remote capture device 210 to capture audio via at least one microphone 218. Continuing with the running example, a remote assembly 202 for use with telecommunications repair may utilize audio information for diagnostic or safety purposes. For example, audio information may capture the sounds of the job site and the audio information may be processed to determine if a job site is safe. Accordingly, in some embodiments, remote capture device 210 may comprise at least one microphone 218 for the capturing of audio information. Similar to the video and three-dimensional information as described above, captured audio information may be stored locally at a memory 214 and/or transmitted to a computer 260 and/or control system 280.

Similar to audio information, remote capture device 210 may further comprise one or more sensors 220 for the capturing of additional sensory information, metrics, or data. For example, continuing with the running example, the remote capture device 210 may be used with a remote assembly 202 positioned at the end of boom assembly 114 for telecommunication or power line work. In such a work application, the remote assembly 202 may be working on or near live power lines or other conductive lines transferring electricity. Accordingly, in some embodiments, remote capture device 210 may comprise at least one sensor 220 configured as an electricity sensor for determining whether a cable or power line has electricity running through it. However, it will be appreciated that remote capture device 210 may comprise additional sensors 220 configured and adapted for providing remote capture device and/or remote assembly 202 with additional information. By way of a non-limiting example, sensor 220 may comprise any of the following sensors: a gyroscope, an accelerometer, a thermometer, a barometer, a light emitter, a voltage detector, a weight-detection sensor, a QR reader, magnetometers, pose sensors, rotary encoders, among other sensors that may be utilized in various applications of remote assembly 202.

For example, in some embodiments, at least one sensor 220 may be adapted and configured as a sensor for estimating the weight of an object. As described in greater detail below with respect to FIG. 3, in some embodiments, comprises a remote assembly comprising a robot unit to perform fine tuning or other dexterous actions and a heavy load bearing utility arm for holding and moving heavy loads. To aid an operator in determining whether the robot unit for fine tuning work can safely hold or manipulate an object, at least one sensor 220 may be a weight estimator. For example, the weight estimator may utilize point cloud weight estimation to estimate the weight of an object. The weight estimator may capture various images of an object for the generation of a point cloud based on the object. By way of non-limiting example, the weight estimator may capture an image of a powerline transformer. The generated point cloud image may determine the transformer comprises a diameter of 13.4" and a height of 15.8." Based on this information, a determination may be made that the transformer comprises a weight of 472.9 Lbs. This information may be presented to computer 260 or an operator in the manner described below, and the computer 260 and/or the operator may make a determination as to whether the robot unit or the heavy load bearing utility arm can safely hold and move an object.

Further, in some embodiments, at least one sensor 220 may be a quick response ("QR") reader for reading QR codes. For example, in some applications, remote assembly 202 may be applied in a scenario in which objects or assets may be applied with or comprise a QR code. Through utilization of a QR reader, information about the object or asset may be quickly ascertained and provided to computer 260 and/or an operator. Non-limiting examples of information that may be obtained through a QR reader may be the BIM specifications of an object, such as weight, size, lifting points, ratings, etc. It should be understood however, that any information about the object or asset may be ascertained through QR reading.

It should be understood that in some embodiments, remote assembly 202 may comprise a plurality of remote capture devices 210. Further, each of the remote capture devices 210 in the plurality of remote capture devices 210 may comprise varying components (I.e., camera 212, three-dimensional camera 216, sensor 220, etc.). Even further, each remote capture device 210 in the plurality of remote capture devices 210 may comprise uniform components. For example, as described above, remote capture device 210 may be used with a boom-mounted robot unit comprising a camera mount and at least one utility arm. A remote capture device 210 comprising camera 212, three-dimensional camera 216, and microphone 218 may be paired or positioned on the camera mount. Simultaneously, a second remote capture device 210 comprising a sensor 220 for detecting an electric voltage and a microphone 218 may be paired or incorporated into the utility arm.

In some embodiments, the remote assembly 202 further comprises at least one digital Hub 222. The digital Hub 222 may receive the captured sensory information from remote capture device 210 and convert the captured sensory information into a format suitable for transmitting to computer 260 and/or control system 280. In some embodiments, the digital Hub 222 is a USB Hub, such as, for example, a USB 3.0. In further embodiments, sensory information may be captured using Ethernet cameras or Ethernet coupled capture devices. Accordingly, in some embodiments, digital hub 222 may be replaced, substituted, or used in conjunction with an ethernet switch. It should be understood that sensory information may be captured in a variety of different formats. Accordingly, remote assembly 202 may utilize any hardware or software for receiving, analyzing, and/or transmitting sensory information.

As further depicted in FIG. 2, remote assembly 202 may further comprise a controller 224. In some embodiments, controller 224 may be a processor or other circuitry or computer hardware for receiving commands or instructions from control system 280 and/or computer 260 and for relaying or providing commands to remote capture device 210 and/or motion controls 230. Accordingly, in some embodiments, instructions, or commands from controller 224 may be sent to remote capture device 210. For example, instructions sent from controller 224 to remote capture device 210 may include instructions to begin recording video via camera 212. However, it will be appreciated that instructions sent from controller 224 may cause any of the components of remote capture device 210 to begin capturing sensory information, including but not limited to three-dimensional information, audio information, or other sensory information captured by any of the sensors 220 of remote capture device 210. Additionally, controller 224 may be used to send instructions to cause remote assembly 202, remote capture device 210, and/or motion controls 230 to perform other actions corresponding to the instructions. For example, instructions from controller 224 may instruct remote capture device 210 to store captured sensory information on memory 214. Additionally, instructions from controller 224 may be sent to motion controls 230 to instruct remote assembly 202 to perform a movement. Further, controller 224 may be in communication with transceiver 244 for communicating with computer 260 and/or control system 280 to send sensory information or other data or information to computer 260 and/or control system 280. Similarly, controller 224 may further be configured for receiving instructions, commands, or other information from computer 260 and/or control system 280. It should be understood that in further embodiments, controller 224 is not required to be directly coupled or incorporated into remote assembly 202. For example, remote assembly 202 may be incorporated into or be a component of a computer 260 and/or control system 280. Accordingly, in some embodiments, controller 224 may be incorporated into or directly paired with computer 260 and/or control system 280. In such embodiments, instructions, commands, or other communications may be sent from controller 224 to remote assembly 202. Remote assembly 202 may comprise computer hardware capable of receiving the transmitted instructions, commands, or communications from controller 224. For example, in some embodiments, it may be advantageous for controller 224 to be incorporated into a high-powered computing system that can transmit information to remote assembly 202.

As further depicted in the block diagram of FIG. 2 and in some embodiments, remote assembly 202 may further comprise motion controls 230. Motion controls 230 may be configured and adapted for controlling the movement of remote assembly 202, including any utility arms or camera mounts as described in greater detail below. In some embodiments, remote assembly 202 may comprise a 6 DOF robot unit configured with utility arms and/or camera mounts that can move with 6 DOF. Accordingly, motion controls 230 may be configured to provide instructions or commands to remote assembly 202 to move in 6 DOF. In some embodiments, motion controls may comprise x-axis control 232, y-axis control 234, z-axis control 236, pitch control 238, yaw control 240, and/or roll control 242 for moving remote assembly 202 with 6 DOF. It will be appreciated however, that remote assembly 202 may comprise varying designs, and in some embodiments, may move in fewer than 6 DOF. Accordingly, in further embodiments, motion controls 230 may comprise controls configured and adapted for moving remote assembly 202 in an appropriate number of planes.

As described above, motion controls 230 may be in communication with controller 224. Instructions or commands from controller 224 may be sent to motion controls 230. Upon receipt of the instructions, the corresponding controls 232, 234, 236, 238, 240, and/or 242 may be instructed to cause movement of the remote assembly 202 based on the received instructions. As described above, one or more arms or limbs of remote assembly 202 may be configured to move with 6 DOF. Based on the instructions, the corresponding motion controls 230 may cause movement of the remote assembly 202 to correspond to the instructions.

As described above, remote assembly 202 may be communicatively coupled to computer 260. In some embodiments, computer 260 may be directly coupled to remote assembly 202, such that computer 260 and remote assembly 202 are a combined system. For example, computer 260 may be directly installed into a frame or body of remote assembly 202. Accordingly, remote assembly 202 and computer 260 may be in direct communication through cables or other direct methods. In further embodiments, computer 260 may be located external to remote assembly 202. When located externally, remote assembly 202 and computer 260 may nevertheless be communicatively coupled. For example, in some embodiments, remote assembly 202 and computer 260 may be coupled through a physical connection such as an Ethernet cable or USB cable. In further embodiments, remote assembly 202 and computer 260 may be coupled through a wireless connection, such as Wi-Fi, BLUETOOTH®, cellular connection, or another wireless connection. In embodiments in which computer 260 and remote assembly 202 are connected through a wireless connection, transceiver 244 may communicate with another transceiver 250 coupled or otherwise in communication with computer 260.

In some embodiments, computer 260 may receive and process sensory information captured by remote capture device 210 of remote assembly 202. Accordingly, computer 260 may comprise at least a processor 262 for executing commands, which may include instructions for processing, analyzing, or utilizing captured sensory information. For example, as described in greater detail below, computer 260 may utilize captured three-dimensional information to generate a point-cloud, three-dimensional model, or other digital representation of an object or area captured by remote capture device 210. In further embodiments, computer 260 may be in communication with one or more databases or data storages. For example, computer 260 may be in communication with a database comprising information directed to product or object information in a telecommunication or powerline setting. This may be particularly beneficial for obtaining information about particular objects or products that may be encountered in the application of various embodiments. For example, described above, remote assembly 202 may comprise a weight estimator utilizing a point cloud for estimating weight of an object. Computer 260 may utilize the data obtained by weight estimator in making an estimation about the weight of the object. In further embodiments and as described above, remote assembly 202 may comprise a QR reader for identifying assets or objects. Once a QR code is scanned, computer 260 may access the storage or database to identify information about the asset or object.

In some embodiments, control system 280 may be an interface, apparatus, or system providing a user with an interactive medium for interacting with computer 260 and/or remote assembly 202. For example, in some embodiments, control system 280 may comprise at least a processor 282, at least one controller 284, at least one display 288, at least one sensor 290, and at least one transceiver 292. As described in greater detail below, some embodiments of the present teachings provide for a method of controlling remote assembly 202 from a remote location. Continuing with the running example, telecommunications repair or power line repair sometimes occurs during or immediately after a severe weather storm. This type of scenario can be wrought with dangers such as exposed and live power lines, high winds, lightning, and other dangers that pose a risk to human workers. Accordingly, it may be advantageous for an operator of remote assembly 202 to control remote assembly 202 in a safe location, such as in a work truck or building away from the job site. Accordingly, control system 280 may comprise at least one interfacing controller 284, providing an interactive means for a user to input commands or instructions for controlling or manipulating remote assembly 202. Controller 284 may be any interface for inputting commands or instructions that can be transmitted and processed by a computer or other hardware. By way of non-limiting example, controller 284 may comprise hand-held motion control controllers. As described in greater detail below, the motion control controllers may be beneficial for an operator to perform specific movements or actions that can be captured and relayed to remote assembly 202 to perform. Through the use of motion-control controllers, an operator may be provided with a sensory effect similar to being at the job site and performing the actions themselves. However, controller 284 is not limited to motion controls and instead, controller 284 may be any interface for an operator to input instructions or commands for remote assembly 202. For example, in further embodiments, controller 284 may be a handheld controller, similar to that of a video game controller comprising thumb sticks, buttons, triggers, and/or other interfacing inputs. In further embodiments, controller 284 may comprise a joystick and button design. In even further embodiments, controller 284 may be a mouse and keyboard. In even further embodiments, controller 284 may be configured as a glove or interactive model of a hand, allowing an operator to perform native hand manipulations which may be captured and transmitted to remote assembly 202. In even further embodiments, controller 284 may comprise a camera component or other motion capture component for capturing the movement of an operator. For example, in addition to, or in place of a physical controller handled by the operator, a camera component may capture the movement of the operator. The captured movement may be transmitted to computer 260 for translation or mapping movement of remote assembly 202. Optionally, or additionally, motion capture aids, such as motion capture dots, may also be used for capturing movement of the operator. In further embodiments, operator inputs may further be captured through AC electromagnetic tracking. In even further embodiments, operator inputs may further be captured through an active force feedback imitative control. In even further embodiments, operator inputs may be further captured through a passive force feedback imitative control. It will be appreciated that the examples provided herein are intended to be illustrative, rather than limiting, and that controller 284 may be any apparatus or method of receiving instructions or an input from an operator or computer for autonomous control.

In some embodiments, control system 280 may further comprise a power medium 286 for powering one or more parts or components of control system, including for example controller 284, display 288, or the at least one sensor 290, or any combination thereof. In some embodiments, a single power medium may power all parts or components of control system 280. In further embodiments, individual parts, or components of control system 280 may comprise a separate and distinct power medium 286. For example, a first power medium 286 may be used for powering controller 284 and a second power medium 286 may be used for powering display 288. Power medium 286 may be any conventionally known power source for providing power to an electrical device, including but not limited to an internal power source such as a battery, or an external battery source such as an electrical outlet.

As further depicted in FIG. 2, control system 280 may further comprise at least one display 288. In some embodiments, display 288 may be a monitor, touchscreen, television screen, or any other display. In some embodiments, at least a portion of the captured sensory information from remote capture device 210 may be displayed on display 288 for an operator to view. For example, captured video may be displayed on display 288. Providing sensory information on display 288 may provide an operator with a more immersive feel when remotely operating remote assembly 202. Through a real-time video feed, an operator may experience the job site as if the operator is physically present, even if the operator is in a safe location miles away. Additionally, providing sensory information to an operator via display 288 may aid the operator in inputting instructions or commands via controller 284.

In some embodiments, control system 280 may further comprise at least one sensor 290, which may provide additional sensory affect to the operator and/or capture additional inputs that may be used by computer 260 to provide instructions to remote assembly 202. In some embodiments, one or more sensors may be combined with controller 284 and/or one or more sensors may be combined with display 288. For example, in some embodiments, sensor 290 may be at least one speaker or sound emitting device to provide the operator with audio information captured from remote capture device 210 or pre-recorded or pre-rendered audio. In further embodiments, the at least one sensor 290 may be one of an inclinometer, an accelerometer, a gyroscope, a light sensor, magnetometers, pose sensors, rotary encoders, or any other type of sensor 290 suitable to detect the viewing angle of the user or the movement, position, or angle of the operator's body.

In some embodiments, and as described in greater detail below, an operator may utilize controller 284, display 288, and the at least one sensor 290 to provide instructions to remote assembly 202, which may be analyzed and translated into instructions to cause remote assembly 202 to move or perform an action. As also described in greater detail below, an operator may input instructions or commands through control system 280. In some embodiments, inputs may be inputted or captured by a combination of controller 284 and display 288. For example, display 288 may be coupled to a head-mounted unit as described in greater detail below. An operator may move their head or torso with sensor 290 capturing the movement and/or viewing angle of the operator. The captured movement data or viewing angle may be sent to computer 260 via transceiver 292, and computer 260 may take the captured movement data or viewing angle and translate into instructions for causing remote assembly 202 to move and mimic or replicate the operator's movement and match the viewing angle of the operator.

Exemplary Hardware

Figure 3:
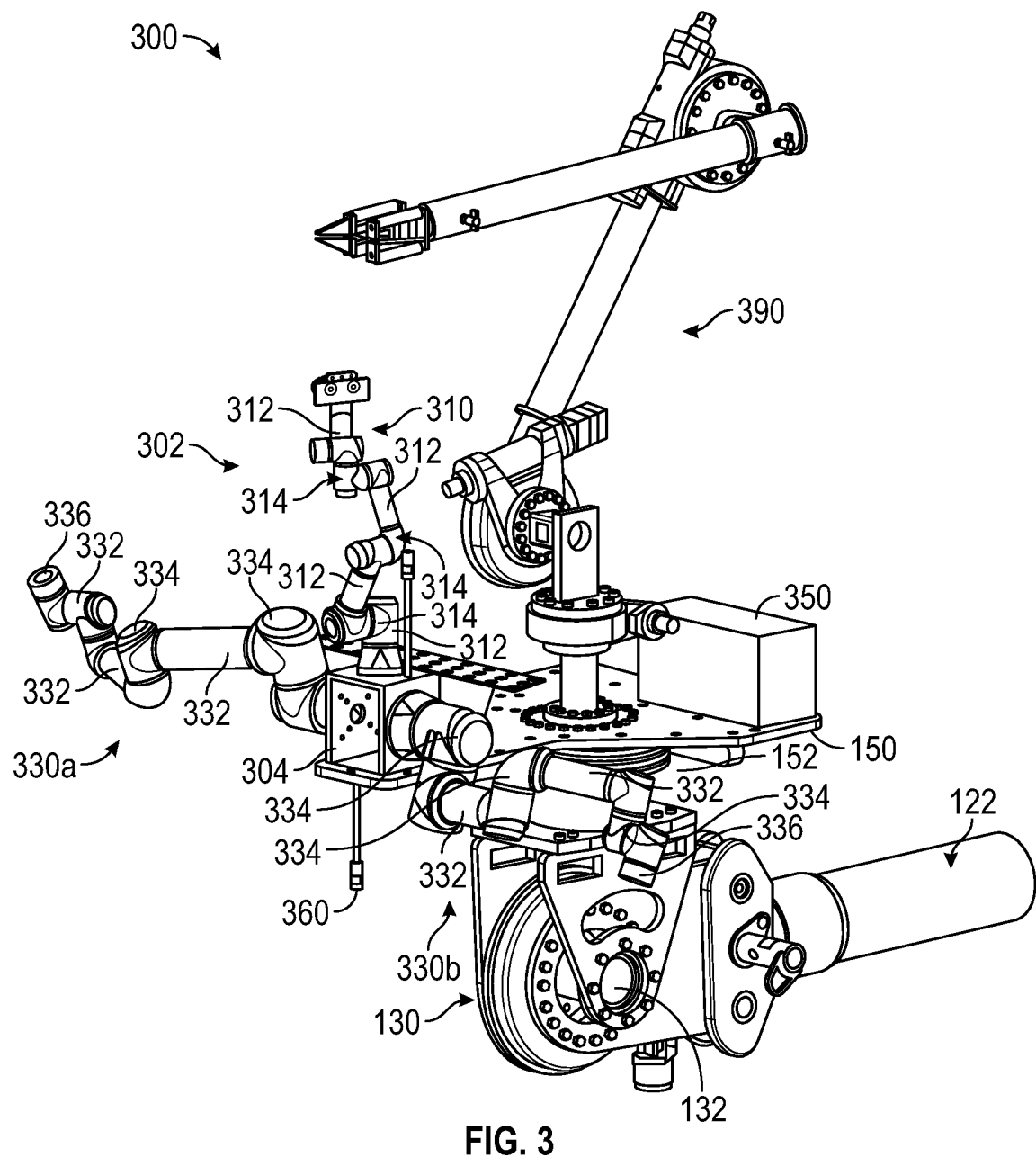
FIG. 3 is a remote assembly system for some embodiments.

FIG. 3 is an exemplary embodiment of a remote assembly system 300. In some embodiments, the remote assembly system 300 may comprise various assemblies, sub-assemblies, parts, or components, including but not limited to a robot unit 302 affixed at the end of a boom assembly 114. Further, the remote assembly system 300 may correspond to the remote assembly 202 as described above with respect to FIG. 2 and may comprise any and all of the components or parts as described above. In some embodiments, robot unit 302 may be configured and adapted to receive instructions from a computer or operator to perform a corresponding movement or action. In some embodiments, robot unit 302 may be a fully manually controlled robot, wherein the robot unit 302 will not perform a movement or action absent an instruction provided from an operator. In further embodiments, robot unit 302 may be a fully automated robot, wherein the robot unit 302 performs actions or movements based on pre-programmed instructions for automation. In even further embodiments, robot unit 302 may be a robot configured to respond to both manually inputted instructions and automated programming. The various movements or actions performed by robot unit 302 and described herein may be performed based on manually provided instructions and/or automated programming. Accordingly, embodiments of the present technology are anticipated to support fully autonomous control, fully manual control, or a hybrid (semi-autonomous) control wherein the operator is interacting with and providing manually-provided inputs along with automated inputs to control remote assembly system 300.

As described above and as illustrated in FIG. 3, in some embodiments remote assembly system 300 may be positioned at the distal end 122 of boom assembly 114. As used herein, remote assembly system 300 and system 300 may be used interchangeably. As depicted, in some embodiments, distal end 122 of boom assembly 114 may comprise a pivot joint 130 comprising a motor 132. In some embodiments, pivot joint 130 may be used to change an angle or position of remote assembly system 300. In further embodiments, pivot joint 130 may be paired with a sensor, such as an inclinometer paired with a rotary encoder for closed-loop feedback, to aid in maintaining a leveled position of remote assembly system 300. However, pivot joint 130 may comprise any sensor, including but not limited to magnetometers, pose sensors, rotary encoders, among other sensors. As further depicted in FIG. 3, pivot joint 130 may further act as an attachment point between remote assembly system 300 and boom assembly 114. For example, base 150 may be coupled to pivot joint 130. Base 150 may be adapted and configured for receiving and coupling remote assembly system 300. Accordingly, through such coupling, remote assembly system 300 may be secured and attached to boom assembly 114. In some embodiments, base 150 may comprise a generally planar design for accepting and securing one or more assemblies, sub-assemblies, parts, or components of remote assembly system 300. Further, the size and shape of base 150 may vary, and may be dependent on the design of remote assembly system 300. Further, in some embodiments, base 150 may further comprise a motorized turntable 152. Motorized turntable 152 may be a power motor train system for rotating base 150. The rotation of base 150 may be advantageous for positioning remote assembly system 300 during use. In some embodiments, the various assemblies, sub-assemblies, parts, and/or components of system 300 may be adapted and configured to be selectively and removably attached to boom assembly 114. For example, utility vehicle 112 may be driven to a job location with a bare boom assembly 114, with the various assemblies, sub-assemblies, parts, and/or components of system 300 stored in or on utility vehicle 112. Once at the job site, system 300 may be assembled for use. This may be advantageous for protecting aspects of system 300 during transit.

In some embodiments, remote assembly system 300 may generally comprise a robot unit 302. Robot unit 302 may be a controllable robotics unit that can perform a range of movements and actions, such as performing repair work in a telecommunications setting. In some embodiments, and as described in greater detail below, robot unit 302 may be a 6 DOF robotics assembly, configured and adapted for mimicking the movement of an operator utilizing a VR controller. Particularly, through a 6-DOF configuration, robot unit 302 may substantially mimic the torso, neck, and arm movements of the operator. Through such movement, robot unit 302 may perform a greater range of movements and/or provide a more immersive experience to an operator than pre-existing systems.

In some embodiments, robot unit 302 may comprise a central hub 304. Central hub 304 may be a central housing or base, which may house a processor, a power source, circuitry, a wireless communication means among other electronics for robot unit 302, including the components described above with respect to FIG. 2. Additionally, central hub 304 may act as a coupling or attachment member, securing robot unit 302 to base 150. Even further, central hub 304 may also act as a receiving point for one or more parts or components of robot unit 302. For example, and as described below, robot unit 302 may comprise at least one utility arm and at least one camera mount. Accordingly, central hub 304 may receive and couple with the at least one utility arm and the at least one camera arm.

To collect sensory information, including but not limited to video and three-dimensional depth information, robot unit 302 may comprise at least one camera mount 310. Camera mount 310 may be a 6 DOF, selectively controllable robotic arm, that may couple to central hub 304. As described in greater detail below, robot unit 302 may receive movement instructions or commands from computer 260 that may cause camera mount 310 to move or change position. For example, camera mount 310 may correspond to a head mount or other capture apparatus to capture the viewing angle of an operator. Instructions or commands may be communicated to robot unit 302 causing camera mount 310 to move in a corresponding manner to match the viewing angle of the operator. To enhance the operator experience, camera mount 310 may comprise a plurality of camera mount segments 312 that may be separated by motorized pivotable joints 314. The number and size of camera mount segments and pivotable joints 314 may vary depending on the embodiments and application of robot unit 302. Generally, in response to an instruction or commands, one or more of the pivotable joints 314 may activate to rotate or move camera mount 310. In some embodiments, the pivotable joints 314 may be used to move camera mount 310 in the X-axis, Y-axis, Z-axis as well as control the roll, pitch, and yaw of the camera mount 310. Accordingly, through movement in the 6 DOF, camera mount 310 may mimic or replicate the viewing angle of the operator. As further depicted in FIG. 3, a distal end of camera mount 310 may further comprise a sensory capture device.

As described above, robot unit 302 may be adapted for performing repair work, maintenance work, or other similar situations, tasks, or actions. To perform these actions, robot unit 302 may comprise at least one utility arm. The depicted embodiment as illustrated in FIG. 3 illustrates an exemplary embodiment of robot unit 302 comprising two utility arms 330a, 330b. Like camera mount 310 as described above, each of utility arms 330a, 330b may comprise a plurality of utility arm segments 332 that may be separated by motorized pivotable joints 334. The number and size of utility mount segments 332 and pivotable joints 334 may vary depending on the embodiments and application of robot unit 302. Generally, in response to an instruction or commands, one or more of the pivotable joints 334 may activate to rotate or move utility arms 330a, 330b. In some embodiments, the pivotable joints 334 may be used to move utility arms 330a, 330b in the X-axis, Y-axis, Z-axis as well as control the roll, pitch, and yaw of the utility arms 330a, 330b. Accordingly, through movement in the 6 DOF, each utility arm 330a, 330b may mimic or replicate the movement of an operator's arms and hands. In some embodiments, the distal ends 336 of utility arms 330a, 330b may comprise one or more tools, flanges, or other apparatus for performing an action such as repair work. In some embodiments, distal ends 336 may comprise an adapter or may be otherwise configured for accepting a tool.

Remote assembly system 300 may further comprise a remote power source 350. In some embodiments, the remote power source 350 may be secured to the base 150. In further embodiments, remote power source 350 may be located within central hub 304. The remote power source 350 may be used to power camera mount 310, utility arm 330a, utility arm 330b, manipulator 390, or any combination thereof. Remote power source 350 may be an electric generator, batteries, or any other known power source.

In further embodiments, robot unit 302 may comprise one or more additional capture devices or sensors 360 for capturing additional information that may be analyzed and/or presented to a user or operator. For example, in some embodiments, robot unit 302 may comprise a thermometer or heat sensor for capturing heat information. In some embodiments, robot unit 302 may comprise an electrical sensor for capturing electrical data. For example, robot unit 302 may be used to work on power lines or in other scenarios involving live power lines or other electrically charged wires or circuitry. accordingly, to avoid damage to the robot unit 302, the boom assembly 114, or the utility vehicle 112, at least one sensor 360 may be a sensor for detecting an electrical current. Additionally, robot unit 302 may comprise at least one sensor 360 that is at least one of an accelerometer, gyroscope, light sensor, or other sensors for detecting the positioning of camera mount 310, utility arm 330a, and/or utility arm 330b. As described in greater detail below, a sensor for detecting the positioning of robot unit 302 may aid in replicating or mimicking movement of an operator using motion controls.

In some embodiments, and as depicted in FIG. 3, in addition to robot unit 302, remote assembly system 300 may further comprise at least one high capacity manipulator 390 or additional robotics assembly that may operate separately or in conjunction with robot unit 302. For example, in many robotics applications, a delicate balance is often considered when designing the features and capabilities of a robot. Typically, robotics adapted and configured for delicate work and fine adjustments are typically not capable of transporting or holding heavy loads. Conversely, robotics adapted and configured for holding or transporting heavy loads typically lack the structural components to perform delicate or fine-tuned actions. By way of non-limiting example, in telecommunication repairs, heavy parts may need to be lifted from the ground to a telecommunication pole. Lifting a heavy part may require a robotic system configured for transporting heavy loads. However, once in position, the part may need a robotic system configured for delicate or sophisticated operations to install the part in position. In some embodiments, robot unit 302 may be configured and adapted for performing movements or actions directed to sophisticated, delicate, or fine-tuning work, such as cutting wire, loosening screws and bolts. In some embodiments, remote assembly system 300 may comprise at least one high-capacity manipulator 390 for holding or transporting heavy loads that may be too heavy for robot unit 302 to safely hold and transport. Accordingly, through the combination of robot unit 302 and high-capacity manipulator 390, remote assembly system 300 may perform both dexterous actions and load-bearing actions. In some embodiments, the below-described phase-lifters 400, 600 may be supported by at least one high capacity manipulator 390.

Cross-Arm Phase-Lifter

Figure 4A:
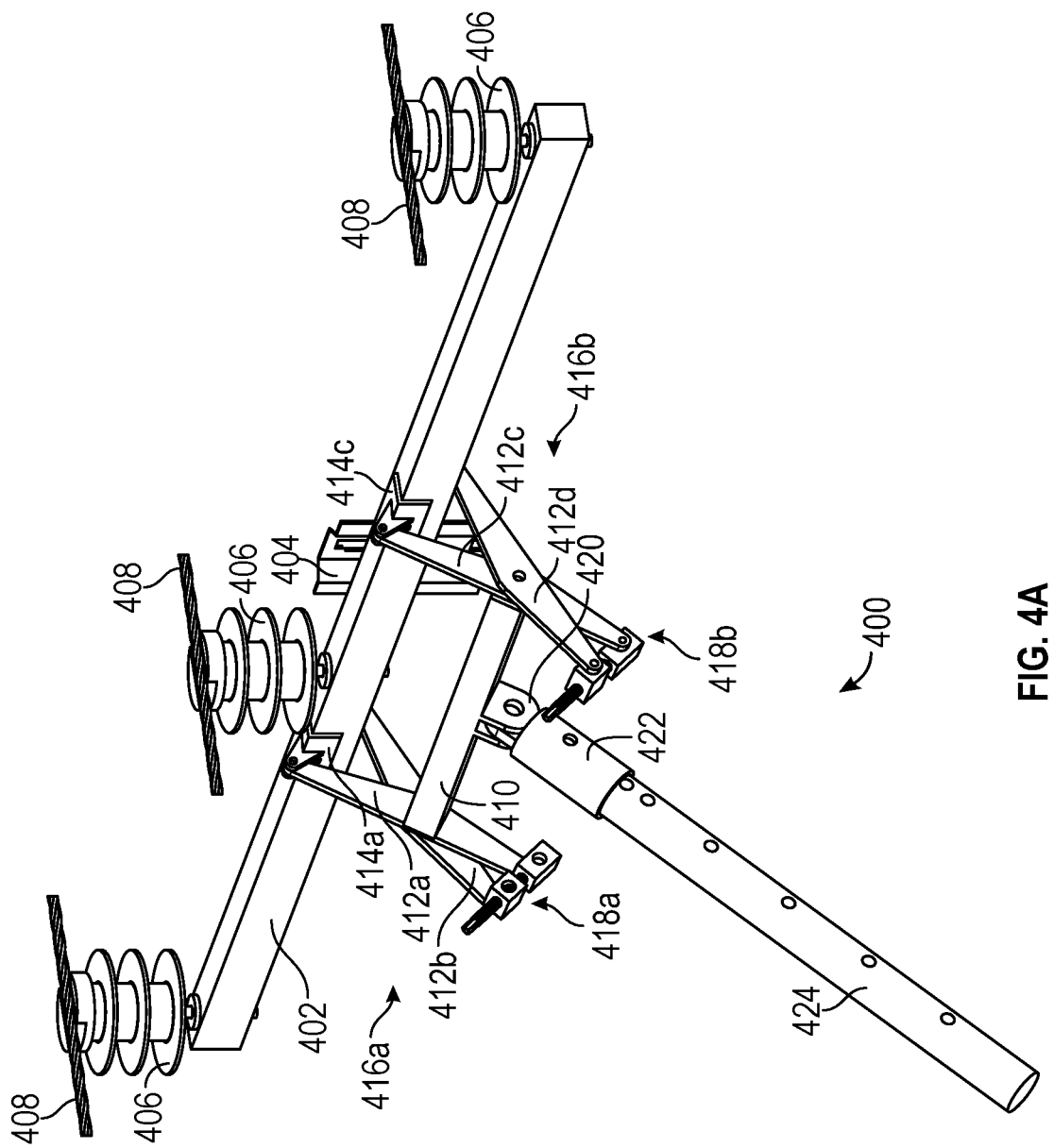
FIG. 4A depicts a first perspective view of a cross-arm phase-lifter for some embodiments.
Figure 4B:
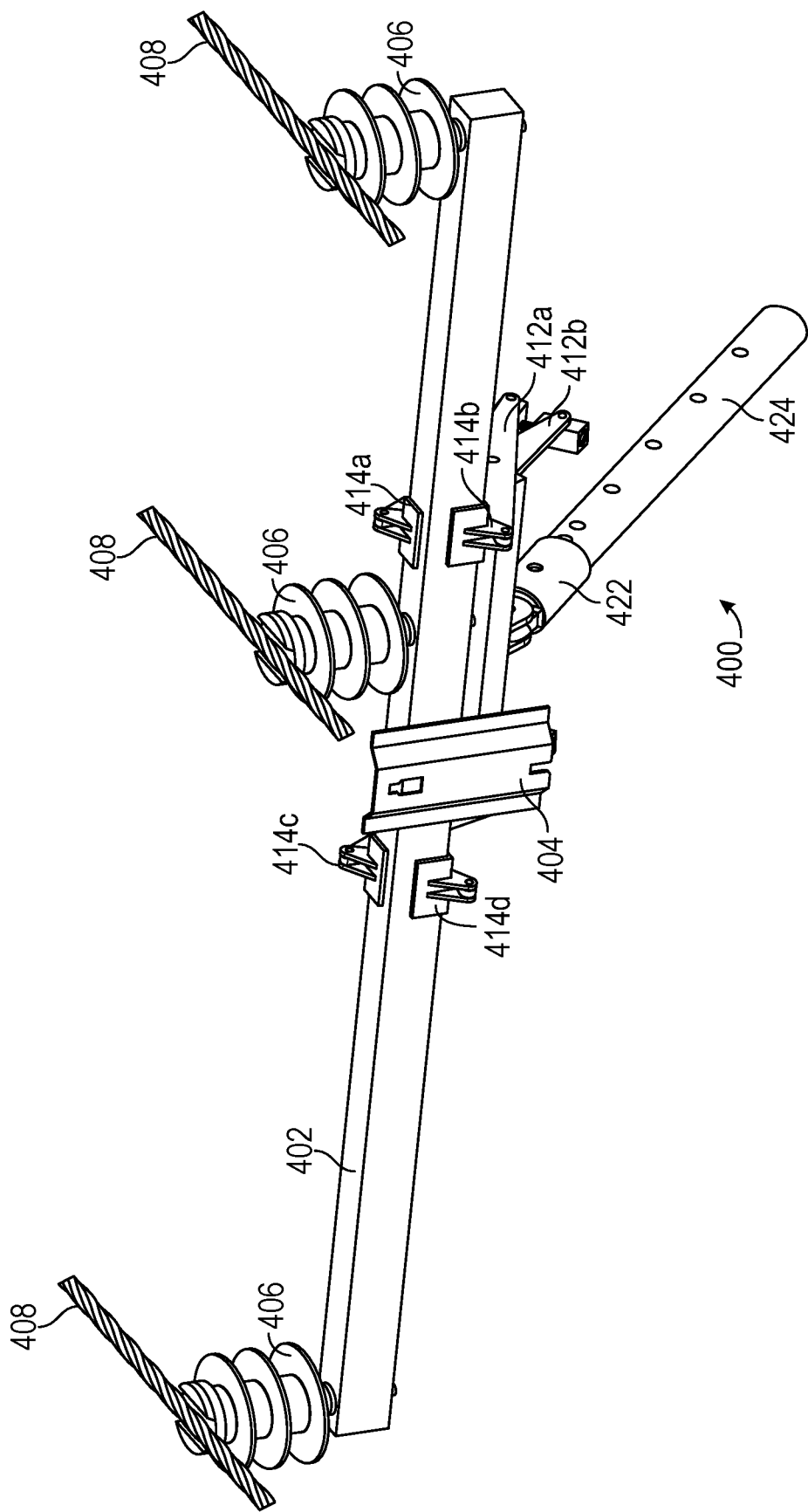
FIG. 4B depicts a second perspective view of the cross-arm phase-lifter for some embodiments.

FIGS. 4A and 4B illustrate a first perspective view and a second perspective view, respectively, of a phase-lifter 400 for some embodiments. As discussed above, phase-lifter 400 may be used to grasp onto a cross-arm 402 for manipulation thereof. For example, phase-lifter 400 may clamp onto cross-arm 402 and may be driven to lift the cross-arm to remove the cross-arm from a utility pole (not shown) to allow for maintenance to be performed thereon with a reduced risk of electrical shock.

Cross-arm 402 comprises a mounting bracket 404 and one or more phase insulators 406. Cross-arm 402 may be coupled to a utility pole via mounting bracket 404. Prior to removing cross-arm 402 from the utility pole, mounting bracket 404 may be detached from the utility pole. For example, robot unit 302 may be operated to detach mounting bracket 404 from the utility pole. Insulators 406 may be mounted on top of the cross-arm 402, and energized power lines 408 may be coupled thereto. Insulators 406 may be tie top insulators, as shown, clamp insulators, vice insulators, or any other type of pole top insulators. In some embodiments, clamp insulators may be used to reduce the stress on the energized power lines 408 when lifting cross-arm 402 as discussed further below. As discussed above, when maintenance needs to be performed, energized power lines 408 are typically removed from insulators 406 and placed onto a temporary phase-holder. The use of the temporary phase-holder requires extra equipment to be brought to a worksite and involves extra steps to perform maintenance.

Phase-lifter 400 may comprise a structural member 410 coupled at a first end to a first clamping member 412a and a second clamping member 412b and coupled at a second end to a third clamping member 412c and a fourth clamping member 412d. In some embodiments, structural member 410 is a crossbar. First clamping member 412a may comprise a first clamp 414a, second clamping member 412b may comprise a second clamp 414b, third clamping member 412c may comprise a third clamp 414c (FIG. 4B), and fourth clamping member 412d may comprise a fourth clamp 414d (FIG. 4B). Clamps 414a, 414c may be positioned to about a top face and a front face of cross-arm 402, with clamps 414b, 414d positioned to clamp onto a bottom face and a back face of cross-arm 402. In some embodiments, clamps 414a, 414b, 414c, 414d are spring-loaded and configured to self-align on cross-arm 402. In some embodiments, clamps 414a, 414b, 414c, 414d comprise rubber or plastic padding to protect cross-arm 402 from potential damage due the force applied by clamps 414a, 414b, 414c, 414d. Clamping members 412a, 412b form a first clamping member pair 416a, and clamping members 412c, 412d form a second clamping member pair 416b. In some embodiments, first clamping member pair 416a is driven by a first actuator 418a, and second clamping member pair 416b is driven by a second actuator 418b, as discussed further below with respect to FIGS. 5A and 5B.

Structural member 410 may comprise a bracket 420 protruding therefrom and configured coupled to a sleeve 422. In some embodiments, bracket 420 extends from near a center of structural member 410. In some embodiments, sleeve 422 is substantially cylindrical. In some embodiments, sleeve 422 is pivotally coupled to bracket 420. In some embodiments, sleeve 422 is coupled substantially perpendicular to bracket 420. Thus, boom extension 424 may be substantially parallel to crossbar 410. Broadly, sleeve 422 may couple to bracket 420 at any angle. Sleeve 422 may connect structural member 410 to a distal end of a boom extension 424. For example, boom extension 424 may be received within the sleeve 422. The boom extension 424 may be coupled to an aerial device extending from a truck or other weighted base (e.g., aerial device 100). In some embodiments, boom extension 424 is electrically insulating and may be made from fiberglass, for example. Boom extension 424 may also be coupled to a clasp or other pole-top structure fastened around a utility pole, providing stability for the cross-arm phase-lifter. For example, a pole-top structure, such as the below-described pole clamp, may be coupled to the utility pole below an existing cross-arm. Phase-lifter 400 may then be coupled to the pole-top structure such that a new cross-arm can be attached to phase-lifter 400 and the phases easily transferred from the existing cross-arm to the new cross-arm on phase-lifter 400 disposed proximal to the existing cross-arm. Additionally, high capacity manipulator 390 of robot unit 302 may couple to the boom extension 424, allowing for the remote operation of the utility pole maintenance by a lineman. Thus, for example, high capacity manipulator 390 may drive phase-lifter 400 to lift cross-arm 402 and hold cross-arm 402 suspended while the dexterous arms are controlled by a remote operator to perform maintenance on the utility pole. Once maintenance is complete, the remote operator can lower cross-arm 402 back onto the utility pole, and the dexterous arms may couple cross-arm 402 back to the utility pole via mounting bracket 404. In some embodiments, boom extension 424 is an insulating dielectric structure to provide additional electric isolation between energized power lines 408 and the supporting structure (e.g., aerial device, remote assembly system 300, etc.).

In some embodiments, high-capacity manipulator 390 may provide over-the-shoulder assistance to robot unit 302. High-capacity manipulator 390 may reach over, around, or under robot unit 302 to lift and support objects (e.g., phase-lifter 400) that may be too heavy or large for the high-dexterity arms 330a, 330b of robot unit 302. As discussed above, high-capacity manipulator 390 may support large and heavy structures while arms 330a, 330b of robot unit 302 perform repair, attachment, maintenance, as well as any other high-dexterity tasks that may be required by robot unit 302. High capacity manipulator 390 is discussed further in detail in U.S. application Ser. No. 17/875,743, titled "COOPERATIVE HIGH-CAPACITY AND HIGH-DEXTERITY MANIPULATORS", the entirety of which is hereby incorporated by reference.

Figure 5A:
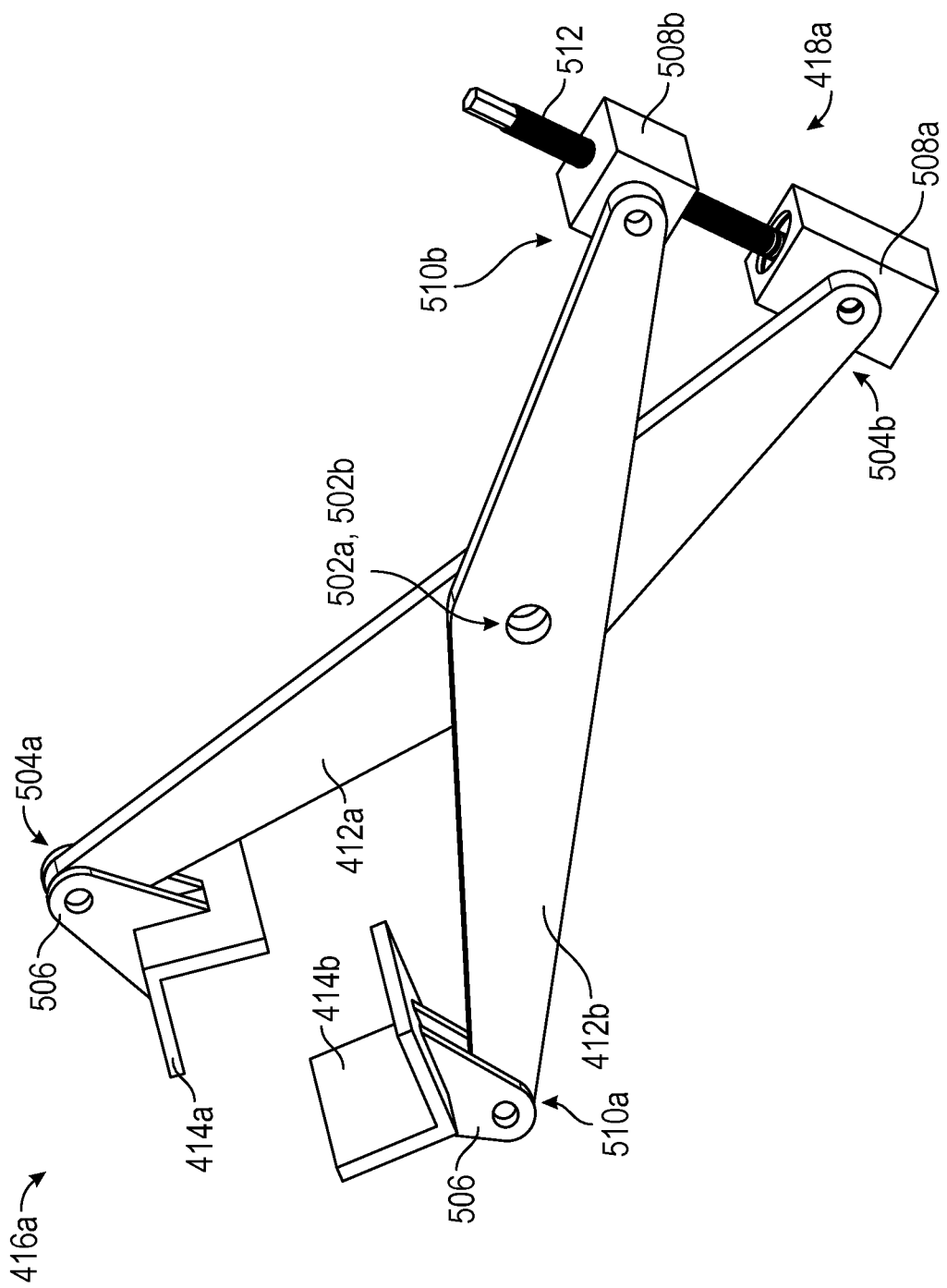
FIG. 5A depicts a clamping member pair of the cross-arm phase-lifter for some embodiments.

FIG. 5A illustrates a clamping member pair 416a formed by clamping members 412a, 412b for some embodiments. Clamping member pair 416a may be substantially similar to clamping member pair 416b formed by clamping members 412c, 412d. Clamping members 412a, 412b may be pivotally coupled at a respective first center 502a and a second center 502b thereof. For example, clamping members 412a, 412b may be coupled using a screw, a bolt, or other like fasteners. In some embodiments, structural member 410 comprises a hole on an end thereof for receiving a fastener therein to couple clamping member pair 416a thereto.

First clamping member 412a may comprise a first end 504a and a second end 504b opposite first end 504a. First end 504a may be coupled to first clamp 414a via a bracket 506, and second end 504b may be coupled to a first actuator block 508a. Similarly, second clamping member 412b may comprise a first end 510a coupled to second clamp 414b via a bracket 506, and a second end 510b opposite the first end 510a may be coupled to a second actuator block 508b. A stud 512 may be received in actuator blocks 508a, 508b and may be driven to engage clamping members pair 416a with the cross-arm 402.

Figure 5B:
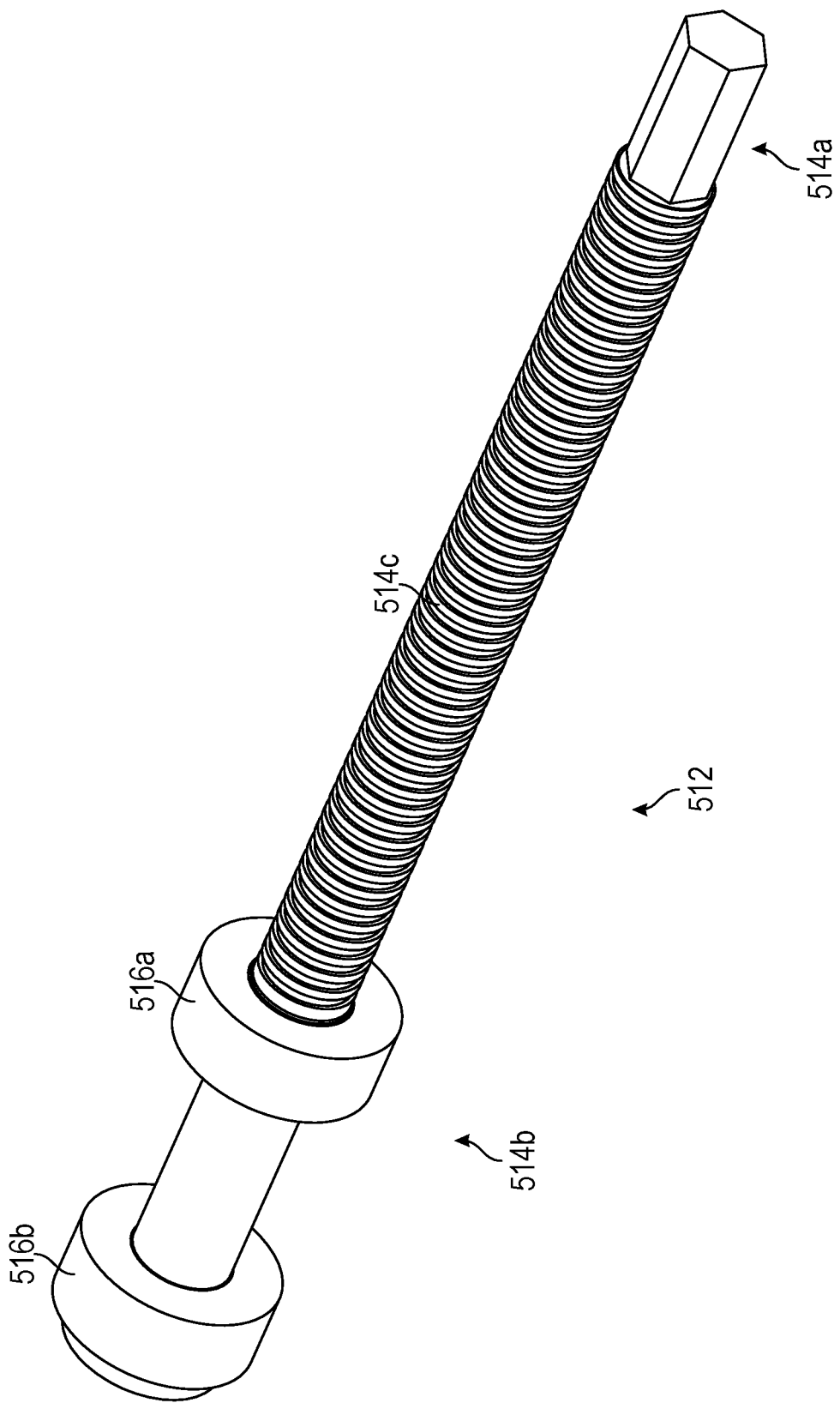
FIG. 5B depicts a stud for actuating the clamping member pair for some embodiments.

FIG. 5B illustrates stud 512 for driving clamping member pairs 416a, 416b for some embodiments. Stud 512 may comprise a proximal end 514a, a distal end 514b, and a threaded section 514c. Proximal end 514a may be unthreaded and configured to couple to a drill or other driving mechanism, such as a motor. For example, robot unit 302 may operate an impact drill and couple the impact drill with proximal end 514a to drive clamping member pair 416a to clamp onto cross-arm 402. In some embodiments, threaded section 514c engages with a set of internal threads (not shown) within second actuator block 508b. As such, when stud 512 is driven, the internal threads of second actuator block 508b and the external threads of threaded section 514c may engage to thread second actuator block 508b distally towards first actuator block 508a, thereby driving first end 510a of second clamping member 412b towards first end 504a of first clamping member 412a.

Distal end 514b may comprise a first stop 516a and a second stop 516b, which may be received within first actuator block 508a. Stops 516a, 516b may prevent translation of first clamping member 412a, thereby allowing second clamping member 412b to be driven down threaded section 514c for coupling to cross-arm 402. Therefore, to grasp onto cross-arm 402, the operator can operate robot unit 302 to position first clamp 414a onto a top surface of cross-arm 402 and drive stud 512 to grasp onto cross-arm 402 with second clamp 414b. In some embodiments, phase-lifter 400 is configured for clamps 414a, 414b, 414c, 414d to apply substantially even pressure to the cross-arm. As discussed above, clamps 414a, 414b, 414c, 414d may comprise a pad (e.g., rubber or plastic) thereon to reduce damage to cross-arm 402 from the force applied thereon. Additionally, the pads may increase the frictional force between clamps 414a, 414b, 414c, 414d and the cross-arm 402.

As illustrated in FIGS. 4A and 4B, clamping member pairs 416a, 416b may be driven by distinct actuators 418a, 418b. In other embodiments, a singular actuator mechanism may simultaneously drive both clamping pairs 416a, 416b. In some embodiments, each clamping pair 416a, 416b may be driven by a separate integrated motor. For example, an integrated motor housed between the clamping member pairs 416a, 416b may drive the stud 512 in each actuator 418a, 418b. The motor may be coupled to a worm gear, for example, to self-lock clamping member pairs 416a, 416b when clamped in the desired position.

It will be appreciated that clamping member pairs 416a, 416b may be driven by various actuators without departing from the scope hereof. For example, hydraulic, and/or pneumatic cylinders may be used as actuators 418a, 418b. In some embodiments, the actuators are linear actuators. Alternatively, or additionally, in some embodiments, rotary actuators (e.g., hydraulic or pneumatic) may be employed to drive clamping member pairs 416a, 416b. Generally, any actuator configured to drive clamping member pairs 416a, 416b is contemplated to be within the scope hereof.

Figure 6A:
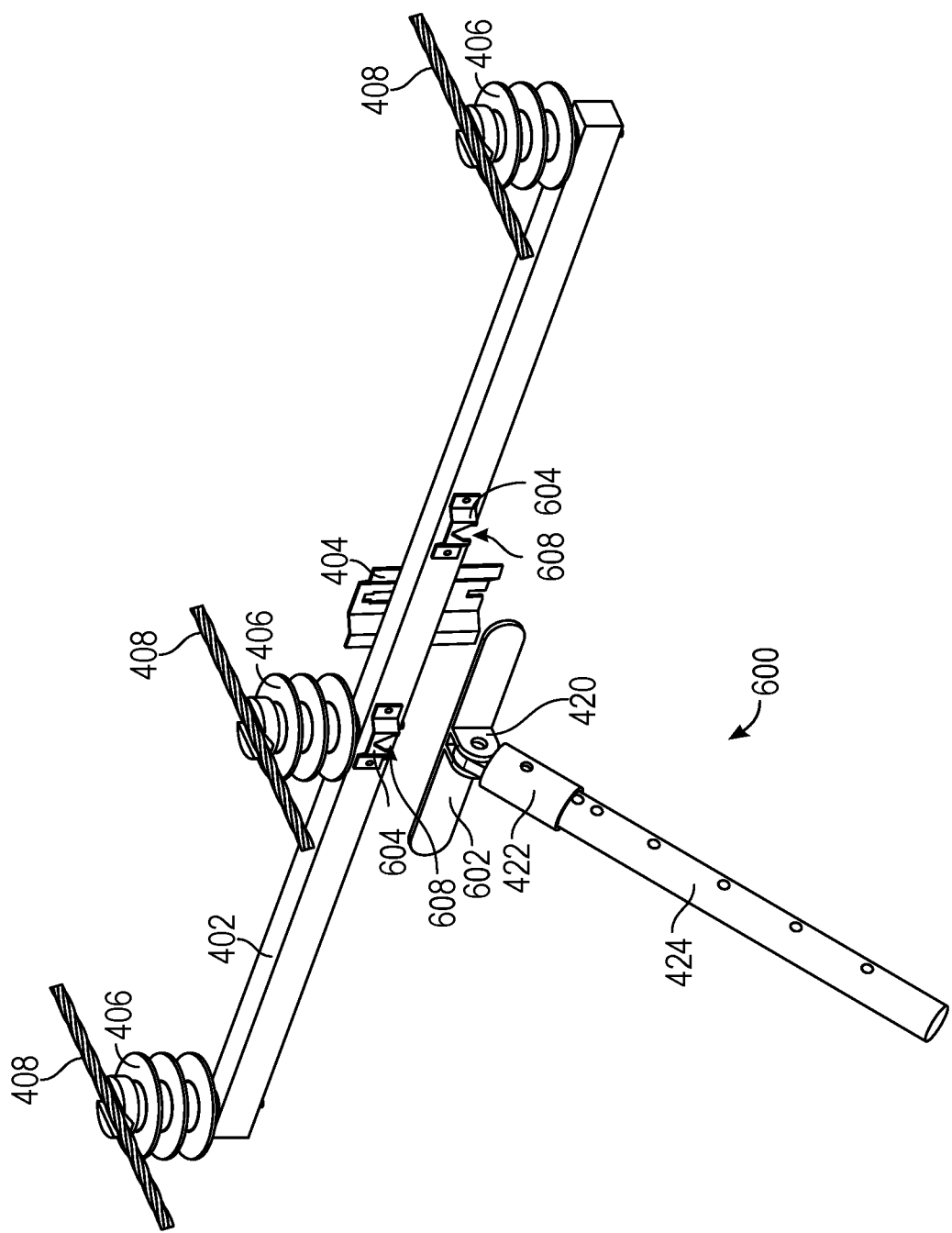
FIG. 6A depicts a first perspective view of a second embodiment of the cross-arm phase-lifter for some embodiments.
Figure 6B:
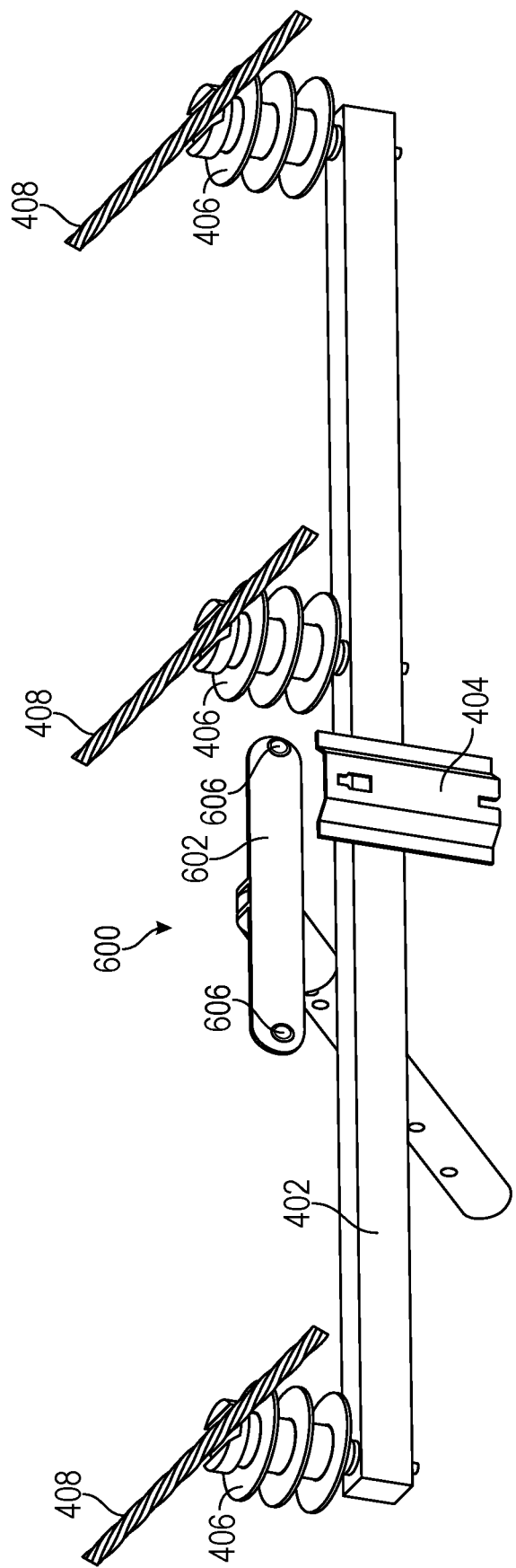
FIG. 6B depicts a second perspective view of the second embodiment of the cross-arm phase-lifter for some embodiments.

FIGS. 6A and 6B illustrate a second embodiment of the cross-arm phase-lifter, designated as phase-lifter 600 for some embodiments. Phase-lifter 600 may comprise a structural member 602 configured to engage with one or more brackets 604 on cross-arm 402. In some embodiments, structural member 602 is a plate, and may be substantially rectangular. In some embodiments, brackets 604 are installed onto a front face of the utility pole cross-arm 402. For example, prior to coupling to cross-arm 402, brackets 604 may be installed by a lineman or robot unit 302. For example, brackets 604 may be installed on the ground prior to lifting phase-lifter 600 into the air. As another example, prior to engaging cross-arm 402 with phase-lifter 600, the arms 330a, 330b may install brackets 604 onto cross-arm 402. Structural member 602 may be oriented substantially parallel to brackets 604. In some embodiments, structural member 602 comprises one or more pegs 606 (FIG. 6B) that engage within the one or more brackets 604. Structural member 602 may comprise additional or fewer mounting pegs 606 without departing from the scope hereof. Structural member 602 may comprise various other engaging means for coupling to cross-arm 402, such as, hooks or magnets, without departing from the scope hereof. In some embodiments, brackets 604 may comprise a slot 608 in which pegs 606 may be received. In some embodiments, slot 608 is tapered. Additionally, a locking mechanism may be implemented to ensure a positive engagement of mounting pegs 606 to brackets 604.

Once engaged with cross-arm 402, phase-lifter 600 may be driven to lift cross-arm 402 off the utility pole, with energized power lines 408 still attached. As described above, phase-lifter 600 may hold cross-arm 402 in suspension to allow for the robot and/or the lineman to operate on the utility pole. Thereafter, phase-lifter 600 may place cross-arm 402 back onto the pole. In some embodiments, a four-bar mechanism (or other actuator mechanism) may be used to adjust the orientation of structural member 602 relative to sleeve 422. For example, a four-bar mechanism may be coupled to a proximal end of boom extension 424 (opposite sleeve 422), and drive boom extension 424 to allow for structural member 602 to be adjusted. The four-bar mechanism may be housed at utility vehicle 112, for example.

Phase-lifter 600 may comprise a bracket 420 coupled to the sleeve 422 as discussed above with respect to FIGS. 4A and 4B to connect phase-lifter 600 to boom extension 424. In some embodiments, high capacity manipulator 390 couples to sleeve 422 to support and drive phase-lifter 400, 600. Alternatively high capacity manipulator 390 may couple directly to structural member 410.

As discussed above, phase-lifter 400, 600 may be coupled to a supporting structure. The supporting structure may lift phase-lifter 400, 600 and hold phase-lifter 400, 600 to suspend cross-arm 402. The supporting structure may be a distal end of an aerial device 100 or high capacity manipulator 390, for example. In some embodiments, the supporting structure is a pole clamp, as discussed further in U.S. application Ser. No. 17/875,674, titled "MANUAL OPERATION OF A REMOTE ROBOT ASSEMBLY", the entirety of which is hereby incorporated by reference. The pole clamp may comprise a first arm and a second arm, and each arm may comprise a clamp to grasp a pole. A four bar linkage may be coupled to arms, and a drive system may be coupled to the four bar linkage. The drive system may comprise a proximal end and a distal end connected by a threaded rod. A motor may be disposed on the proximal end and may be coupled to the threaded rod. The rod may be threadedly engaged with the distal end such that, when the rod is driven by the motor, the distal end moves proximally along the rod and towards the proximal end. As the distal end moves towards the proximal end, the arms may separate and decouple from the pole. As such, to grasp onto a pole, the rod may be threaded in a first direction to move distal end distally away from the proximal end. To detach from the pole, the rod may be threaded in a second direction, opposite from the first direction, to move the distal end towards the proximal end.

Figure 7:
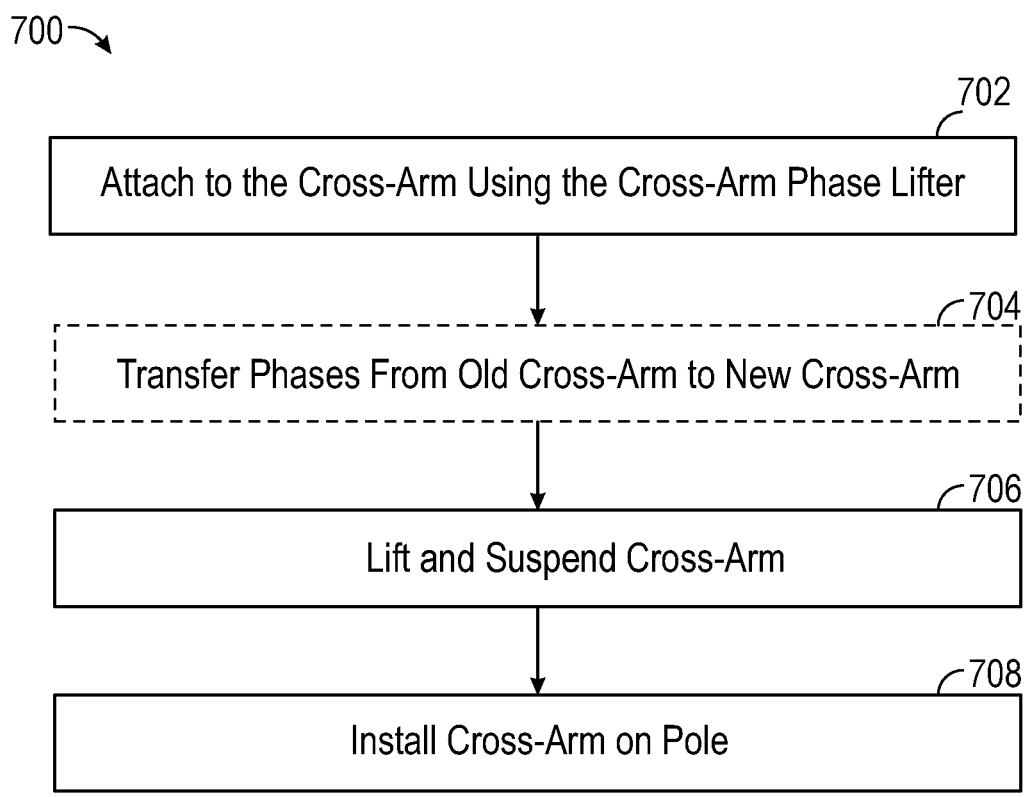
FIG. 7 depicts an exemplary method of performing utility pole maintenance using the cross-arm phase-lifter for some embodiments.

FIG. 7 depicts a method 700 of using phase-lifter 400, 600 to manipulate cross-arm 402 for some embodiments. As discussed above, in some embodiments, phase-lifter 400, 600 may be driven and/or supported by a boom assembly, a robot unit, a pole clamp.

In step 702, phase-lifter 400, 600 may be coupled to cross-arm 402. As described above, in some embodiments, phase-lifter 400 may couple to cross-arm 402 by actuating clamping member pairs 416a, 416b to secure cross-arm 402 between clamps 414a, 414b, 414c, and 414d. In other embodiments, such as when using phase-lifter 600, coupling to cross-arm 402 may be performed by engaging pegs 606 of the structural member 602 with the brackets 604 of the cross-arm.

In optional step 704, energized power lines 408 are moved off insulators 406 of the existing cross-arm 402 and onto the insulators 406 of the new cross-arm 402. Step 704 may be performed when the cross-arm maintenance includes replacing an existing cross-arm with a new cross-arm, for example. As such, a new cross-arm 402 may be coupled to phase-lifter 400, 600 at step 702, and phase-lifter 400, 600 can be raised to the top of the utility pole. The energized power lines 408 and insulators 406 may then be removed from the old cross-arm (e.g., using the robot) and installed onto the new cross-arm 402. Thereafter, the old cross-arm may be removed from the utility pole In step 706, cross-arm phase-lifter 400, 600 may be lifted to suspend cross-arm 402. Phase-lifter 400, supported by either an aerial boom or robot unit, may be driven to lift up the body of the cross-arm, decoupling the cross-arm mounting bracket 404 from the utility pole (not pictured). In some embodiments, phase-lifters 400, 600 can be manually lifted by a lineman. The lineman or robot unit may interact with phase-lifter 600 at the boom extension 424. The maintenance operations can be performed by a lineman or a dexterous robot assembly.

Lastly, at step 708, the cross-arm 402 can be re-installed onto the utility pole by lowering cross-arm 402 back onto the utility pole using phase-lifter 400, 600. Utility pole mounting bracket 404 may be used to engage the new cross-arm with the utility pole after maintenance is complete. In some embodiments, robot unit 302 reattaches mounting bracket 404 to cross-arm 402.

In some embodiments, operations of phase-lifter 400, 600 are performed automatically by robot unit 302. For example, remote assembly system 300 may be programmed to perform the above-described actions of coupling to cross-arm 402, lifting cross-arm 402 an appropriate distance off the utility pole so that operations can be performed thereon, and reinstalling cross-arm 402 onto the pole once operations are complete.

The following U.S. patent applications, each filed Jul. 28, 2022, are each hereby incorporated by reference in their entirety as if set forth herein verbatim: U.S. application Ser. No. 63/392,927, titled "REDUCING LATENCY IN HEAD-MOUNTED DISPLAY FOR THE REMOTE OPERATION OF MACHINERY"; U.S. application Ser. No. 17/875,674, titled "MANUAL OPERATION OF A REMOTE ROBOT ASSEMBLY"; U.S. application Ser. No. 17/875,710, titled "AUTONOMOUS AND SEMI-AUTONOMOUS CONTROL OF AERIAL ROBOTIC SYSTEMS"; U.S. application Ser. No. 17/875,743, titled "COOPERATIVE HIGH-CAPACITY AND HIGH-DEXTERITY MANIPULATORS"; U.S. application Ser. No. 17/875,796, titled "ROTARY TOOL FOR REMOTE POWER LINE OPERATIONS"; U.S. application Ser. No. 17/875,821, titled "OPERATION AND INSULATION TECHNIQUES"; U.S. application Ser. No. 17/875,893, titled "COORDINATE MAPPING FOR MOTION CONTROL"; U.S. application Ser. No. 17/875,943, titled "WIRE TENSIONING SYSTEM"; and U.S. Application Ser. No. 63/393,047, titled "ELECTRICALLY INSULATING BLANKET WITH MEMORY SET". The subject matter described in the foregoing U.S. patent applications may be combined with the subject matter of the present disclosure. For example, one or more embodiments, features, structures, acts, etc. described in any one or more of the foregoing U.S. patent applications may be combined with one or more embodiments, features, structures, acts, etc. described in the present disclosure.

Although the present teachings have been described with reference to the embodiments illustrated in the attached drawing figures, it is noted that equivalents may be employed, and substitutions made herein without departing from the scope of the present teachings as recited in the claims.

Having thus described various embodiments of the disclosure, what is claimed as new and desired to be protected by Letters Patent includes the following:

1. A system for performing maintenance on a utility pole having energized powerlines thereon, comprising:
   a phase-lifter comprising a connecting assembly for coupling the phase-lifter to a cross-arm; and
   a robot assembly, comprising:
      a high-capacity manipulator configured to couple to the phase-lifter and to hold the phase-lifter in a suspended state; and at least one high-dexterity robotic arm configured to perform maintenance on the utility pole while the cross-arm is held by the high-capacity manipulator.

2. The system of claim 1, wherein the connecting assembly comprises:
a structural member having a first end and a second end, the structural member comprising:
a first lifting peg on the first end and a second lifting peg on the second end,
wherein the first lifting peg and the second lifting peg are configured to couple to a first bracket and a second bracket on the cross-arm.

3. The system of claim 1, wherein the connecting assembly comprises:
a first clamping member pair and a second clamping member pair for coupling to the cross-arm; and
at least one actuator for actuating the first clamping member pair and the second clamping member pair.

4. The system of claim 3, wherein the at least one high-dexterity robotic arm operates an impact drill configured to actuate the at least one actuator to clamp the first clamping member pair and the second clamping member pair to the cross-arm.

5. The system of claim 3, wherein the at least one actuator comprises a self-locking actuator to lock the first clamping member pair and the second clamping member pair in a clamped position.

6. The system of claim 1, wherein the high-capacity manipulator is further configured to place the phase-lifter onto the utility pole when the maintenance is complete.

7. The system of claim 1,
wherein the cross-arm is a new cross-arm, and
wherein performing the maintenance comprises transferring, by the at least one high-dexterity robotic arm, the energized powerlines from an existing cross-arm on the utility pole to the new cross-arm held by the high-capacity manipulator.

8. The system of claim 1,
wherein the high-capacity manipulator couples to the phase-lifter at a proximal end of the phase-lifter, and
wherein the proximal end of the phase-lifter is an insulating dielectric structure to provide electrical isolation between the energized powerlines and the robot assembly.

9. The system of claim 1, further comprising:
one or more tools associated with the robot assembly for performing the maintenance on the utility pole,
wherein the at least one high-dexterity robotic arm comprises an adapter for coupling to each of the one or more tools.

10. A robot unit for performing maintenance on a utility pole having a cross-arm with energized powerlines thereon, the robot unit comprising:
a high-capacity manipulator having a distal end for coupling to a first end of a phase-lifter,
wherein the phase-lifter is configured to be coupled at a second end to the cross-arm, and
wherein the high-capacity manipulator is configured to:
lift the phase-lifter to remove the cross-arm from the utility pole, and
suspend the phase-lifter while maintenance is performed on the utility pole; and
at least one high-dexterity robotic arm configured to perform maintenance on the utility pole while the phase-lifter is suspended
wherein the at least one high-dexterity robotic arm is further configured to actuate the phase-lifter to couple the phase-lifter to the cross-arm.

11. The robot unit of claim 10, wherein the at least one high-dexterity robotic arm operates an impact drill to clamp at least one clamping member pair on the second end of the phase-lifter to the cross-arm to couple the phase-lifter to the cross-arm.

12. The robot unit of claim 10 wherein performing maintenance on the energized powerlines comprises transferring the energized powerlines from the cross-arm to a new cross-arm.

13. The robot unit of claim 10, wherein the high-capacity manipulator is further configured to lower the cross-arm onto the utility pole when the maintenance is complete.

14. The robot unit of claim 13, wherein the at least one high-dexterity robotic arm is further configured to couple the cross-arm to the utility pole.

15. The robot unit of claim 10, wherein the robot unit operates autonomously.

16. The robot unit of claim 10, wherein at least a portion of the phase-lifter is electrically insulating.

17. A method for performing maintenance on a utility pole having energized power lines thereon, comprising:
coupling a high-capacity manipulator of a robot unit to a first end of a phase-lifter;
coupling, by one or more high-dexterity robotic arms of the robot unit, a second end of the phase-lifter to a cross-arm;
holding, by the high-capacity manipulator, the phase-lifter in suspension; and
performing maintenance on the utility pole using the one or more high-dexterity robotic arms while the phase-lifter is suspended.

18. The method of claim 17,
wherein the cross-arm is a new cross-arm, and
wherein performing maintenance on the utility pole comprises removing energized powerlines from an existing cross-arm atop the utility pole to the new cross-arm.

19. The method of claim 18, further comprising:
removing the existing cross-arm from the utility pole; and
installing, with the robot unit, the new cross-arm on the utility pole.

20. The method of claim 17, further comprising:
operating, by at least one of the one or more high-dexterity robotic arms, a tool to couple to the phase-lifter to the cross-arm.

* * * * *